United States Patent
Konishi

(10) Patent No.: US 10,468,942 B2
(45) Date of Patent: Nov. 5, 2019

(54) BEARING DEVICE, CONVEYING DEVICE, INSPECTION DEVICE, AND MACHINE TOOL

(71) Applicant: NSK LTD., Tokyo (JP)

(72) Inventor: Hirohide Konishi, Kanagawa (JP)

(73) Assignee: NSK LTD., Tokyo (JP)

( * ) Notice: Subject to any disclaimer, the term of this patent is extended or adjusted under 35 U.S.C. 154(b) by 394 days.

(21) Appl. No.: 15/305,220

(22) PCT Filed: Apr. 22, 2015

(86) PCT No.: PCT/JP2015/062270
§ 371 (c)(1),
(2) Date: Oct. 19, 2016

(87) PCT Pub. No.: WO2015/163376
PCT Pub. Date: Oct. 29, 2015

(65) Prior Publication Data
US 2017/0047811 A1   Feb. 16, 2017

(30) Foreign Application Priority Data

Apr. 23, 2014 (JP) ................... 2014-089367
May 15, 2014 (JP) ................... 2014-101283
Mar. 4, 2015 (JP) ................... 2015-042417

(51) Int. Cl.
*H02K 5/16* (2006.01)
*H02K 7/08* (2006.01)
(Continued)

(52) U.S. Cl.
CPC ........ *H02K 7/08* (2013.01); *B23Q 7/02* (2013.01); *F16C 25/08* (2013.01); *F16C 33/768* (2013.01);
(Continued)

(58) Field of Classification Search
CPC ................................... H02K 7/08
(Continued)

(56) References Cited

U.S. PATENT DOCUMENTS 5,997,119 A 12/1999 Kerr
7,589,448 B2 * 9/2009 Nakano ............ H02K 5/1732
310/90

(Continued)

FOREIGN PATENT DOCUMENTS

CN 102341566 A 2/2012
CN 102530057 A 7/2012
(Continued)

OTHER PUBLICATIONS

Communication dated Nov. 15, 2018, from United States Patent and Trademark Office in counterpart U.S. Appl. No. 15/303,957.
(Continued)

*Primary Examiner* — Alexander Talpalatski
(74) *Attorney, Agent, or Firm* — Sughrue Mion, PLLC

(57) ABSTRACT

A bearing includes an inner ring and an outer ring arranged to face each other with a rolling element interposed therebetween, and a housing including a housing inner supported by the inner ring and a rotor flange supported by the outer ring. The rotor flange includes a flange portion extending toward one end surface side in an axial direction of the outer ring, and a C-type retaining ring arranged at the other end surface side in the axial direction of the outer ring. A push ring formed of a resin material is provided in a gap between the flange portion and the one end surface in the axial direction.

17 Claims, 11 Drawing Sheets

(51) Int. Cl.

| | | |
|---|---|---|
| *F16C 35/077* | (2006.01) | |
| *F16C 41/00* | (2006.01) | |
| *G01D 5/20* | (2006.01) | |
| *H02K 11/21* | (2016.01) | |
| *B23Q 7/02* | (2006.01) | |
| *F16C 33/76* | (2006.01) | |
| *F16C 33/78* | (2006.01) | |
| *F16C 35/067* | (2006.01) | |
| *F16C 35/073* | (2006.01) | |
| *F16C 25/08* | (2006.01) | |
| *F16C 19/06* | (2006.01) | |

(52) U.S. Cl.
CPC ........ *F16C 33/7833* (2013.01); *F16C 35/067* (2013.01); *F16C 35/073* (2013.01); *F16C 35/077* (2013.01); *F16C 41/00* (2013.01); *G01D 5/20* (2013.01); *H02K 11/21* (2016.01); *F16C 19/06* (2013.01); *F16C 2202/22* (2013.01); *F16C 2380/26* (2013.01)

(58) Field of Classification Search
USPC .......................................................... 310/90
See application file for complete search history.

(56) References Cited

U.S. PATENT DOCUMENTS

| | | | |
|---|---|---|---|
| 7,819,246 B2 | 10/2010 | Takiuchi et al. | |
| 8,038,352 B2 | 10/2011 | Dodoro et al. | |
| 8,459,402 B2 | 6/2013 | Hamakita et al. | |
| 8,505,706 B2* | 8/2013 | Horling | B65G 39/09 193/37 |
| 9,638,307 B2* | 5/2017 | Kikuchi | B62D 5/0409 |
| 2008/0139420 A1 | 6/2008 | Takiuchi et al. | |
| 2010/0278467 A1 | 11/2010 | Hirose et al. | |
| 2011/0120797 A1* | 5/2011 | Kitahata | B62D 5/04 180/443 |
| 2012/0111657 A1* | 5/2012 | Hamakita | B62D 5/0409 180/444 |

FOREIGN PATENT DOCUMENTS

| | | |
|---|---|---|
| DE | 203 01 647 U1 | 4/2003 |
| DE | 10 2009 001 359 A1 | 9/2010 |
| EP | 2 428 430 A1 | 3/2012 |
| EP | 2 450 262 A1 | 5/2012 |
| JP | 07-224817 A | 8/1995 |
| JP | 2001-065584 A | 3/2001 |
| JP | 2002-087010 A | 3/2002 |
| JP | 2003-170835 A | 6/2003 |
| JP | 2013-170835 A | 6/2003 |
| JP | 2006-200658 A | 8/2006 |
| JP | 2007-321894 A | 12/2007 |
| JP | 2008-202782 A | 9/2008 |
| JP | 2009-103206 A | 5/2009 |
| JP | 2010-216580 A | 9/2010 |
| JP | 4636432 B2 | 2/2011 |
| JP | 2012-125129 A | 6/2012 |
| JP | 2012-178926 A | 9/2012 |
| JP | 2014-059034 A | 4/2014 |
| WO | 2006/077810 A1 | 7/2006 |
| WO | 2010/100021 A2 | 9/2010 |

OTHER PUBLICATIONS

Communication dated Dec. 14, 2017, from the European Patent Office in counterpart European Application No. 15782778.3.
Communication dated Apr. 26, 2018, issued by the Korean Intellectual Property Office in corresponding Korean Application No. 10-2016-7029316.
International Search Report of PCT/JP2015/062270 dated Jul. 21, 2015 [PCT/ISA/210].
Communication dated Feb. 23, 2018, from State Intellectual Property Office of the P.R.C. in counterpart application No. 201580020686.3.
Communication dated Feb. 24, 2018, from State Intellectual Property Office of the P.R.C. in counterpart application No. 201580020688.2.
Communication dated Aug. 29, 2017, from the European Patent Office in counterpart European Application No. 15783856.6.
Communication dated Feb. 7, 2017, from the Japanese Patent Office in counterpart Japanese application No. 2016-515185.

\* cited by examiner

BEARING DEVICE, CONVEYING DEVICE, INSPECTION DEVICE, AND MACHINE TOOL

CROSS REFERENCE TO RELATED APPLICATIONS

This application is a National Stage of International Application No. PCT/JP2015/062270, filed Apr. 22, 2015, claiming priorities based on Japanese Patent Application Nos. 2014-089367, filed Apr. 23, 2014, 2014-101283, filed May 15, 2014, 2015-042417, filed Mar. 4, 2015, the contents of all of which are incorporated herein by reference in their entirety.

BACKGROUND OF THE INVENTION

1. Field of the Invention

The present invention relates to a bearing device, and a conveying device, an inspection device, and a machine tool using the bearing device.

2. Description of the Related Art

Direct drive motors (bearing devices, hereinafter referred to as DD motors) that employ a drive system (motor load direct connection type drive system) to directly transmit a rotational force to a rotating body, and rotate the rotating body in a predetermined direction with respect to a rotated body are conventionally known. This kind of DD motor includes a bearing including an inner ring and an outer ring arranged to face each other with a rolling element interposed therebetween, a first housing supported by the inner ring, and a second housing supported by the outer ring, and rotates the first housing or the second housing as an output shaft (rotating body). The DD motor detects a rotational state (for example, a rotational speed, a rotating direction, and a rotation angle) of the output shaft in a more accurate manner in order to position the output shaft while rotating the output shaft in a highly accurate manner. Therefore, the support structure of the bearing to support the housings is important, and especially, suppression of movement (thrust play) of the bearing in the axial direction is required. Conventionally, C-type retaining rings have been often used to fix the bearing in the axial direction of the bearing. In this technology, a groove with a diameter slightly larger than an outer diameter of the bearing is machined in one of the housings (for example, the second housing) near the bearing, and a C-type retaining ring is mounted in the groove, so that the bearing is fixed in the axial direction using force of the retaining ring expanding outward. However, in this technology, machining errors of the groove and the like need to be taken into account in addition to dimensional tolerance of the bearing and the C-type retaining ring in the axial direction, and complete suppression of the movement of the bearing in the axial direction is difficult.

To realize highly accurate rotation of the motor while suppressing the movement of the bearing in the axial direction, and firmly support the load fixed to the output shaft, in a conventionally proposed structure, the first housing and the second housing are each divided into two parts at bearing portions in the axial direction such that the divided housings sandwich the bearing, and the divided housings are fastened with bolts or the like (for example, see Prior Art 1).

Prior Art 1: JP 4636432 B2

By the way, as a product for industrial application, it is important to configure the bearing incorporable as easily as possible, and downsize the bearing. In the conventional technology, the movement of the bearing in the axial direction can be suppressed, but the support structure of the bearing is complicated. Furthermore, in a case where the divided housings are fastened with bolts, a plurality of bolts (for example, six bolts or more) is typically provided on a concentric circle with the bearing. The plurality of bolts needs to be uniformly fastened so that the housings are uniformly in contact with an end surface of the bearing in the axial direction. Although it is possible for a human to tighten the bolts little by little while feeling contact reaction force against screw holes, it takes long to perform the work, and it has been difficult to automate the work using a device.

The present invention solves the above-described problem, and an objective is to provide a bearing device that can prevent movement of a bearing in an axial direction with a simple configuration, and a conveying device, an inspection device, and a machine tool that use the bearing device.

SUMMARY OF THE INVENTION

To solve the above-described problem, a bearing device of the present invention includes: a bearing including an inner ring and an outer ring arranged to face each other with a rolling element interposed therebetween; and a housing including a first housing supported by the inner ring and a second housing supported by the outer ring. At least one of the first housing and the second housing includes a flange portion extending toward one end surface side in an axial direction of the bearing, and a retaining ring arranged at the other end surface side in the axial direction of the bearing, and a push ring formed of a resin material is provided in a gap between the flange portion and the one end surface in the axial direction of the bearing, or a gap between the retaining ring and the other end surface in the axial direction of the bearing.

According to this configuration, the push ring formed of a resin material is provided in the gap between the flange portion and the one end surface in the axial direction of the bearing, or the gap between the retaining ring and the other end surface in the axial direction of the bearing. Therefore, this push ring absorbs width dimensional tolerance of the retaining ring and the bearing in the axial direction, so that movement of the bearing in the axial direction can be prevented with a simple configuration.

In this configuration, the at least one housing in which the flange portion is formed may include a groove portion extending in a circumferential direction, and the retaining ring may be mounted in the groove portion. According to this configuration, the retaining ring can be easily attached to the housing, and the structure to support the bearing can be simplified.

Furthermore, the first housing and the second housing may be each formed into a cylindrical shape, and the at least one housing in which the flange portion is formed may be seamlessly molded in an extending direction of the cylinder. According to this configuration, the bearing can be supported without increasing the size in the axial direction of the one housing in which the flange portion is formed, which enables a decrease in size of the bearing device.

Furthermore, the push ring may include a first contact surface being in contact with the flange portion or the retaining ring, and a second contact surface being in contact with the one end surface or the other end surface in the axial direction of the bearing, and the first contact surface and the second contact surface may be formed at positions shifted in a radial direction of the push ring. According to this configuration, a large distortion amount (deflection amount) of the push ring can be secured when a load is applied to the push ring, which allows the push ring to be effectively deformed.

Furthermore, the push ring may be provided in the gap between the flange portion and the one end surface in the axial direction of the bearing, and a first gap sealing member formed of a resin material may be arranged in at least one of the gap between the retaining ring and the other end surface in the axial direction of the bearing, and a gap between the retaining ring and the groove portion. According to this configuration, the first gap sealing member seals a gap caused by waviness or warp of the retaining ring or the groove portion. Therefore, a decrease in rigidity of the bearing device can be suppressed.

Furthermore, the first gap sealing member may be a resin film sticking on the retaining ring. According to this configuration, the first gap sealing member can be easily arranged in the gap between the retaining ring and the other end surface in the axial direction of the bearing, and the gap between the retaining ring and the groove portion.

Furthermore, the first gap sealing member may be an adhesive including a main agent, and a curing agent that is mixed with the main agent and cures the main agent. According to this configuration, the adhesive is cured after the retaining ring is mounted in the groove portion, so that the gap caused by the waviness or the warp of the retaining ring or the groove portion can be easily sealed.

Furthermore, the retaining ring may be mounted in the groove portion in a state where one of the main agent and the curing agent is applied on the other end surface in the axial direction of the bearing and the groove portion, and the other of the main agent and the curing agent is applied on the retaining ring. According to this configuration, premixture of the adhesive is unnecessary. Therefore, the other end surface in the axial direction of the bearing and the groove portion can be left in a state of the main agent or the curing agent being applied, which improves flexibility in the assembling process of the bearing.

Furthermore, the adhesive may be configured such that the curing agent encapsulated in a microcapsule is mixed in the main agent, and the curing agent and the main agent may be mixed and cured by the microcapsule being broken by external force. According to this configuration, for example, the adhesive is applied on the retaining ring in advance, so that the adhesive can be cured after the retaining ring is mounted in the groove portion, and then it becomes easy to handle the adhesive.

Furthermore, a second gap sealing member may be arranged in at least one of a gap between the inner ring and the first housing and a gap between the outer ring and the second housing. According to this configuration, the second gap sealing member seals the gap, whereby simplification of machining of the first housing and the second housing can be achieved, and movement of the bearing in the radial direction can be suppressed.

Furthermore, the second gap sealing member may be an adhesive that is cured after being filled in the gap. According to this configuration, alignment of the center of the bearing, and the centers of the first housing and the second housing is realized by balancing of tension by the adhesive filled in the gap.

Furthermore, the first housing and the second housing may be formed of a magnetic body, and an electroless nickel-phosphorus plating process may be performed on surfaces of the first housing and the second housing in which the second gap sealing member is arranged. According to this configuration, aligning force can be increased compared with one on which no electroless nickel-phosphorus plating process is performed.

Furthermore, the bearing device of the present invention may include: a motor unit including a stator fixed to one of the first housing and the second housing, and a rotor fixed to the other of the first housing and the second housing and rotatable with respect to the stator; and a rotation detector configured to detect a rotational state of the motor unit. The rotation detector may be a single resolver of an incremental type, the resolver detecting relative displacement of the rotor with respect to the stator. According to this configuration, an increase in height of the housings in the axial direction can be suppressed, and a decrease in size of the bearing device can be achieved.

Furthermore, the bearing device of the present invention may include: a power factor detection unit configured to detect a position where a power factor becomes 0 when power is supplied to the motor unit; and a translocation control unit configured to control translocation of the motor unit according to the position where the power factor becomes 0, and incremental information output from the resolver. According to this configuration, the rotational state of the motor unit can be accurately detected even with the configuration in which the single resolver is mounted.

Furthermore, the resolver may be configured from a resolver stator fixed to the first housing, and a resolver rotor facing the resolver stator with a predetermined interval and fixed to the second housing, and the resolver rotor may be fixed to the second housing to have a space in a surface opposite to a facing surface facing the resolver stator. According to this configuration, the resolver is less affected by the outside, and self-inductance is stabilized. Therefore, relative displacement of the rotor with respect to the stator can be more accurately detected.

Furthermore, the motor unit, the bearing, and the resolver may be arranged side by side in an axial direction of the bearing. According to this configuration, it is possible to suppress an increase in size in the radial direction about the rotation axis, which allows the installation area (so-called footprint) of the bearing device to be reduced.

Furthermore, a conveying device of the present invention includes the above-described bearing device. The conveying device is configured to convey an object to be conveyed by rotation of the first housing or the second housing. According to this configuration, positional accuracy in conveying the object to be conveyed can be enhanced, and a decrease in size of the conveying device can be realized.

An inspection device of the present invention includes: the above-described bearing device; and an inspection unit configured to individually inspect an object moved by rotation of the first housing or the second housing. According to this configuration, positional accuracy in moving the object to the inspection unit can be enhanced, and a decrease in size of the inspection device can be achieved.

Furthermore, a machine tool of the present invention includes: the above-described bearing device; and a machining unit configured to individually machine an object moved by rotation of the first housing or the second housing. According to this configuration, the positional accuracy in moving the object to the machining unit can be enhanced, and a decrease in size of the machine tool can be realized.

According to the present invention, the push ring formed of a resin material is provided in the gap between the flange portion and the one end surface in the axial direction of the bearing or the gap between the retaining ring and the other end surface in the axial direction of the bearing. Therefore, the push ring absorbs width dimensional tolerance of the retaining ring and the bearing in the axial direction, whereby movement of the bearing in the axial direction can be prevented with a simple configuration.

DETAILED DESCRIPTION OF THE PREFERRED EMBODIMENT

Modes (embodiments) for implementing the present invention will be described in detail with reference to the drawings. The present invention is not limited by the content described in the embodiments below. Furthermore, the configuration elements described below include those easily conceived by a person skilled in the art, and those substantially the same. Furthermore, the configuration elements described below can be appropriately combined, and in a case where there is a plurality of embodiments, the embodiments can be combined.

First Embodiment

Figure 1:
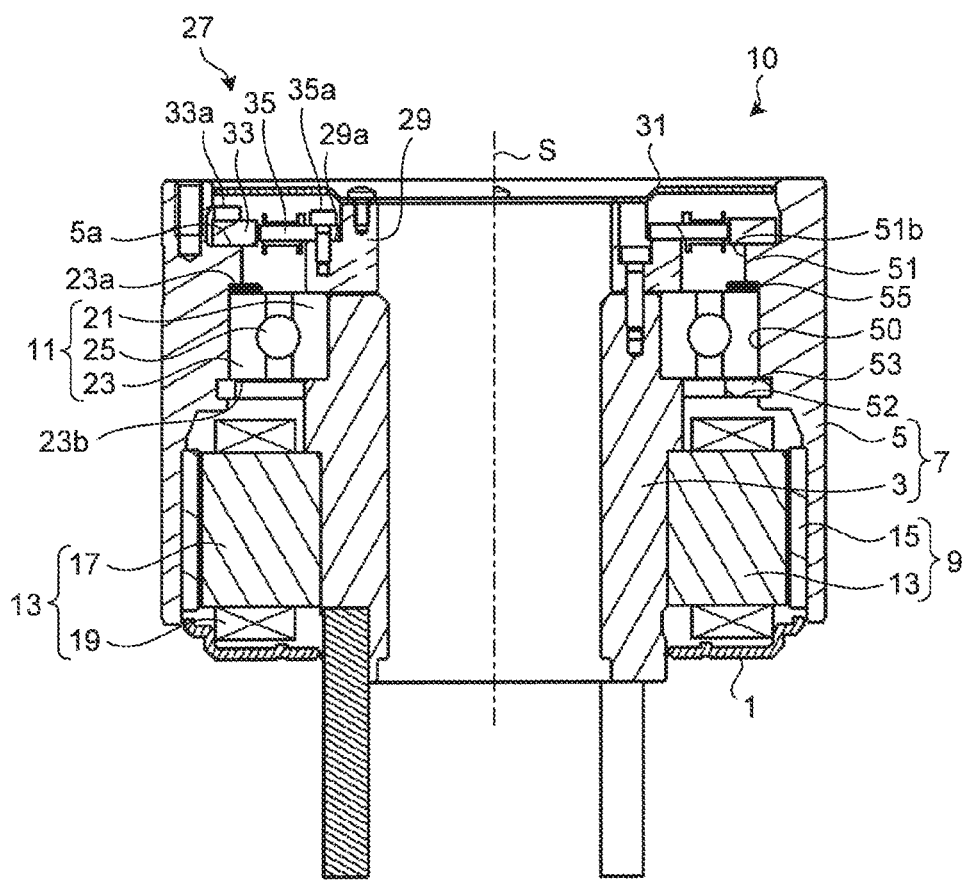
FIG. 1 is a cross-sectional view illustrating a configuration of a direct drive motor according to a first embodiment.

FIG. 1 is a cross-sectional view illustrating a configuration of a direct drive motor according to a first embodiment. A direct drive motor (bearing device, hereinafter referred to as DD motor) 10 can directly transmit rotational force to a rotating body without having a reduction mechanism (for example, a reduction gear and a transmission belt) interposed therebetween, and can rotate the rotating body in a predetermined direction.

The DD motor 10 of the present embodiment is configured as a so-called outer rotor-type motor. The DD motor 10 includes, as illustrated in FIG. 1, a housing 7 that includes an annular housing inner (first housing) 3 fixed to a base 1 and an annular rotor flange (second housing) 5 arranged outside the housing inner 3. Furthermore, the DD motor 10 includes a motor unit 9 incorporated between the housing inner 3 and the rotor flange 5, and rotates the rotor flange 5 with respect to the housing inner 3, and a bearing 11 that rotatably supports the rotor flange 5 with respect to the housing inner 3.

The housing inner 3 and the rotor flange 5 are formed into substantially cylindrical shapes with different diameters, and arranged on concentric circles with respect to a rotation axis S. The rotor flange 5 is seamlessly molded in an extending direction (in an up and down direction in FIG. 1) of the cylinder. That is, the rotor flange 5 is configured to be continuous, in a substantially cylindrical manner, throughout the entire periphery from a lower end portion to an upper end portion in an axial direction of the rotation axis S, and various workpieces (not illustrated) can be attached to the upper end portion. By rotating the rotor flange 5 by the motor unit 9, the various workpieces can be rotated in a predetermined direction together with the rotor flange 5. As described above, the rotor flange 5 performs rotational motion about the rotation axis S by the operation of the motor unit 9, and thus functions as an output shaft. Furthermore, the housing inner 3 is configured to be continuous, in a substantially cylindrical manner, throughout the entire periphery from the lower end portion to the bearing 11 in the axial direction of the rotation axis S, and sandwiches the bearing 11 with an inner ring holder 29.

The motor unit 9 is arranged at a lower portion of the housing 7 (near the base 1). The motor unit 9 includes a stator (stationary element) 13 fixed to an outer peripheral surface of the housing inner 3, and a rotor (rotating element) 15 fixed to an inner peripheral surface of the rotor flange 5 and arranged to face the stator 13. The stator 13 includes motor cores 17 concentrically arrayed along a rotating direction of the rotor flange 5 at predetermined intervals (for example, at equal intervals), and stator coils 19, wires that are wound in a multiple manner, are fixed to the respective motor cores 17. Wiring for supplying power from a control unit 20 (FIG. 2) is connected to the stator 13, and the power is supplied to the stator coil 19 through the wiring. The rotor 15 is configured from permanent magnets concentrically arrayed along the rotating direction of the rotor flange 5 at predetermined intervals (for example, at equal intervals). When electricity is supplied to the stator coil 19 through the control unit 20, rotational force is provided to the rotor flange 5 according to the Flemings' left hand rule, and the rotor flange 5 is rotated in a predetermined direction.

The bearing 11 is arranged at a position farther from the base 1 than the motor unit 9 is in the axial direction. The bearing 11 includes an inner ring 21 and an outer ring 23 arranged to face each other in a relatively rotatable manner, and a plurality of rolling elements 25 provided between the inner ring 21 and the outer ring 23 in a rollable manner. It is preferable that one bearing 11 can sustain both of an axial load and a moment load, and for example, a four point contact ball bearing, a three point contact ball bearing, a deep-groove radial bearing, or a cross roller bearing can be employed. In a case of employing the cross roller bearing, it is preferable to use a bearing having a structure in which an inner ring and an outer ring are integrated with each other, instead of using a bearing having a typical structure in which an inner ring and an outer ring are separately provided. The inner ring 21 is sandwiched by the housing inner 3 and the inner ring holder 29, and the outer ring 23 is fixed to the inner peripheral surface of the rotor flange 5. The support structure of the bearing 11 will be described below.

Furthermore, the DD motor 10 is provided with a resolver (rotation detector) 27 for detecting a rotational state (for example, a rotational speed, a rotating direction, and a rotation angle) of the motor unit 9 above the bearing 11 (i.e., at a position farther from the base 1 than the bearing 11 is in the axial direction). Accordingly, the various workpieces attached to the rotor flange 5 can be accurately rotated by a predetermined angle, and can be accurately positioned at a target position. Furthermore, the resolver 27 is separated and protected from the outside world by a disk-like cover 31 provided on an upper portion of the inner ring holder 29 connected to the housing inner 3.

In the present embodiment, the DD motor 10 is configured such that the motor unit 9, the bearing 11, and the resolver 27 are vertically arranged in the housing 7 in the axial direction (in the up and down direction in FIG. 1) of the rotation axis S. Accordingly, in the DD motor 10, it is possible to suppress an increase in dimensions in a radial direction about the rotation axis S, which allows an installation area (so-called footprint) of the housing 7 to be reduced. Meanwhile, in recent years, DD motors in which not only the installation area of the housing but also a height dimension in the axial direction is decreased have been desired. Typically, in a DD motor, two types of resolvers including an absolute resolver and an incremental resolver for performing positioning of the motor and feedback of speed control are mounted as rotation detectors in order to accurately detect the rotational state of the motor unit. These resolvers are vertically arranged in the axial direction. The resolvers are positioned so as to be engaged with an inner diameter side of the housing of the motor, for example, and are fixed with bolts or the like after a resolver rotor is fixed. In this configuration, the dimension of the DD motor in the axial direction is increased to mount these two types of resolvers.

To solve this problem, in the present embodiment, the single resolver 27 is arranged in the housing 7. The resolver 27 is an incremental resolver that detects a relative displacement of the rotor 15 with respect to the stator 13. The resolver 27 includes an annular resolver rotor 33 having an inner periphery that is eccentric with respect to an axial center of the bearing 11, and a resolver stator 35 that is arranged to face the resolver rotor 33 with a predetermined interval and that detects reluctance change between the resolver stator 35 and the resolver rotor 33. The resolver rotor 33 is integrally attached to a resolver rotor fixing portion 5a formed on the inner peripheral surface of the rotor flange 5 with a bolt 33a. Furthermore, the resolver stator 35 is integrally attached to a resolver stator fixing portion 29a formed on an outer peripheral surface of the inner ring holder 29 with a bolt 35a. By making the resolver rotor 33 eccentric to change the distance between the resolver rotor 33 and the resolver stator 35 in a circumferential direction, reluctance is changed according to a position of the resolver rotor 33. Therefore, a basic wave component of the reluctance change has one cycle per rotation of the rotor flange 5, and thus the resolver 27 outputs a resolver signal (incremental information) changed according to a rotation angle position of the rotor flange 5.

Figure 2:
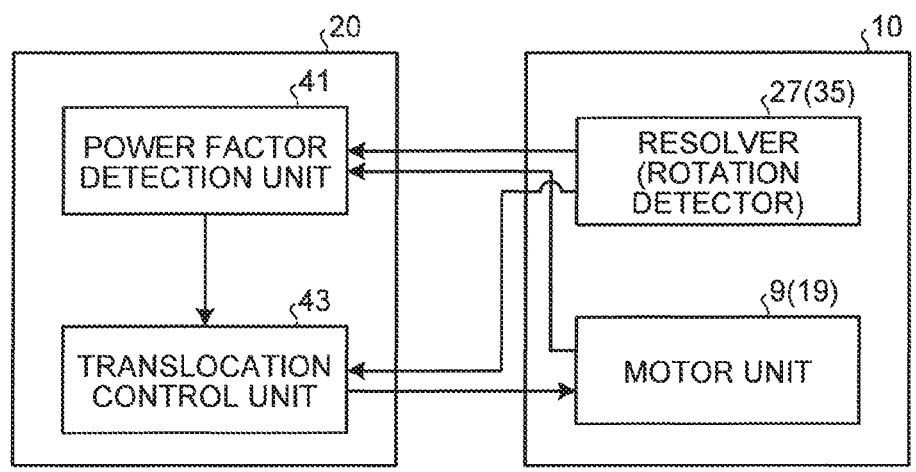
FIG. 2 is a block diagram illustrating a configuration to control a rotation angle position of the direct drive motor.

FIG. 2 is a block diagram illustrating a configuration to control the rotation angle position of the DD motor. The control unit 20 that controls the operation of the DD motor 10 is connected to the DD motor 10. This control unit 20 includes a power factor detection unit 41 that detects a power factor from a resolver signal detected by the resolver 27, a motor current output from the motor unit 9, and the like, and also includes a translocation control unit 43 that controls translocation of the motor unit 9 based on the detected power factor and the resolver signal.

In the embodiment, the power factor detection unit 41 detects a position of the resolver rotor 33 where the power factor becomes 0 when power is supplied to the motor unit 9 (stator coil 19), and sets the detected position as a reference position. Then, the power factor detection unit 41 outputs the reference position to the translocation control unit 43. The translocation control unit 43 acquires the resolver signal detected by the resolver 27, and controls translocation timing of the motor current flowing in the motor unit 9 based on change of the resolver signal and the reference position. Accordingly, the absolute resolver is not necessary in detecting the translocation timing of the motor current. Therefore, it is not necessary to mount the two types of rotation detectors including the absolute resolver and the incremental resolver, unlike the conventional configuration. Therefore, the single resolver configuration can be employed, and the height of the DD motor 10 in the axial direction can be suppressed.

By the way, the DD motor 10 needs to more accurately detect the rotational state in order to accurately position and rotate the rotor flange 5 as the output shaft. Therefore, the support structure of the bearing 11 that supports the housing inner 3 and the rotor flange 5 is important, and especially, a structure that enables easy suppression of the movement (thrust play) of the bearing 11 in the axial direction has been desired. Next, the support structure of the bearing 11 will be described.

An outer ring holding portion 50 is formed throughout the entire periphery of the inner peripheral surface of the rotor flange 5, as illustrated in FIG. 1, and a flange portion 51 with a diameter shorter than an outer diameter of the bearing 11 (outer ring 23) and protruding inward is formed throughout the entire periphery of the outer ring holding portion 50 at the resolver 27 side. Furthermore, a groove portion 52 with a diameter longer than the outer diameter of the bearing 11 (outer ring 23) is formed in the outer ring holding portion 50 at the motor unit 9 side. The flange portion 51 extends to one end surface (a resolver 27-side end surface, or one axial-direction end surface) 23a side in the axial direction of the outer ring 23. The flange portion 51 is preferably formed such that an inner peripheral surface 51b of the flange portion 51 is positioned outside an inner peripheral surface of the outer ring 23 and is positioned inside a chamfer portion of the outer ring 23. According to this structure, the flange portion 51 can reliably support the outer ring 23 of the bearing 11.

Furthermore, a C-type retaining ring (retaining ring) 53 having spring force trying to expand in the radial direction is mounted in the groove portion 52, and the C-type retaining ring 53 extends to the other end surface (a motor unit 9-side end surface, or the other axial-direction end surface) 23b side in the axial direction of the outer ring 23. An outer diameter of the groove portion 52 is slightly larger than an outermost diameter of the outer ring 23 of the bearing 11, and even if an allowable load of the bearing 11 itself is applied to the C-type retaining ring 53, the C-type retaining ring 53 does not come off. As the retaining ring, not only the C-type retaining ring but also a spring ring can be used.

As described above, the bearing 11 is sandwiched by the flange portion 51 and the C-type retaining ring 53 respectively provided in the upper and lower portions (both ends) of the outer ring holding portion 50 in the axial direction. However, the bearing 11 and the C-type retaining ring 53 usually have dimensional tolerance in the axial direction, and considering a machining error of the groove portion 52 and the like, it is difficult to support the bearing 11 by the flange portion 51 and the C-type retaining ring 53 while completely suppressing the movement (thrust play) of the bearing 11 in the axial direction. Therefore, in the present configuration, a push ring 55 (FIG. 3) formed of a polymeric resin material is arranged in a gap between the one end surface 23a in the axial direction of the outer ring 23 and the flange portion 51. Because the push ring 55 is annually formed of a polymeric resin material such as a thermoplastic resin and a thermosetting resin, the push ring 55 can absorb width dimensional tolerance of the bearing 11 in the axial direction, and completely prevents the bearing 11 from moving in the axial direction.

In a case of providing the push ring 55 made of a thermoplastic resin in the DD motor 10, like the present embodiment, it is preferable to use a thermoplastic resin having heat resistance at 100° C. or more. Furthermore, it is preferable to use a thermoplastic resin having excellent characteristics such as compressive yield strength, bend strength, and a compressive elastic modulus (or a tensile elastic modulus, a Young's modulus, or the like). As a specific example, a material called super engineering plastic such as polyether ether ketone (PEEK), polyether sulfone (PES), and polyphenylene sulfide (PPS) is preferable in terms of heat resistant temperature and mechanical properties. Furthermore, in a case where resistance to solvents is required, a crystalline resin is preferable. However, for the DD motor 10, either of the crystalline resin or a non-crystalline resin can be used. Furthermore, in molding the push ring, the thermoplastic resin, which can be used not only in machining operation but also in metal molding, is more preferable.

Figure 3:
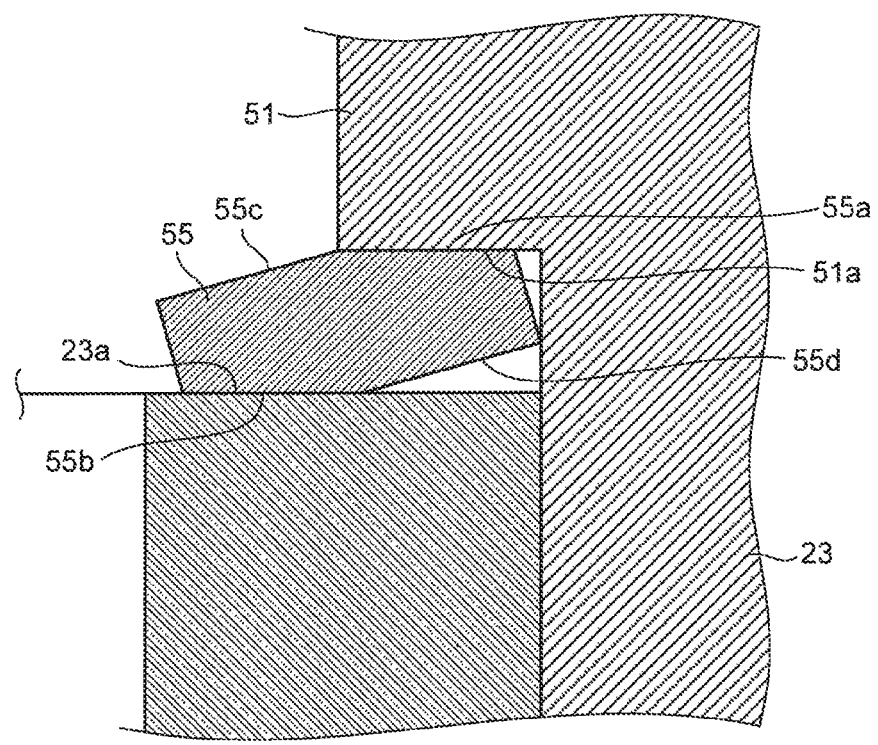
FIG. 3 is a partially enlarged cross-sectional view illustrating a cross-sectional shape of a push ring.

Furthermore, a distortion amount required for the push ring 55 molded with a thermoplastic resin can be calculated from variation in thickness of the C-type retaining ring 53, machining errors of the position and the height of the groove portion 52, the width dimensional tolerance of the bearing 11 in the axial direction, and the like. This distortion amount is a distortion amount in a state where the basic dynamic load rating of the bearing 11 is applied so that the bearing 11 is not damaged. Here, the flange portion 51 and the outer ring 23 have nearly the same diameter dimensions. Therefore, when the push ring 55 has a simple flat ring shape that has nearly the same diameter dimension as the outer ring 23, the distortion amount is determined according to a vertical elastic modulus and the Young's modulus of the resin, and thus only a small distortion amount can be allowed. Therefore, in the present embodiment, as illustrated in FIG. 3, the push ring 55 includes a first contact surface 55a that is in contact with a support surface 51a of the flange portion 51, and a second contact surface 55b that is in contact with the one end surface 23a in the axial direction of the outer ring 23. The first contact surface 55a and second contact surface 55b are formed at positions shifted in the radial direction of the push ring 55. To be specific, the push ring 55 has a substantially hexagonal shape in a cross section, and includes a first inclined surface 55c that is continuous to the first contact surface 55a and is inclined in a direction away from the support surface 51a, and a second inclined surface 55d that is continuous to the second contact surface 55b and is inclined in a direction away from the one end surface 23a in the axial direction. Then, the second inclined surface 55d is provided below the first contact surface 55a in the axial direction, and the first inclined surface 55c is provided above the second contact surface 55b in the axial direction. Accordingly, when a load in the axial direction is applied to the push ring 55, the push ring 55 is distorted using a gap between the second inclined surface 55d and the one end surface 23a in the axial direction of the outer ring 23, thereby securing a large distortion amount (deflection amount) of the push ring 55, and performing effective deformation.

Once arranged, the push ring 55 has compression characteristics of being not substantially changed depending on temperature, a moderate creep property, and fatigue characteristics, and thus can suppress movement of the bearing 11 in the axial direction in a state of being incorporated in the DD motor 10. Furthermore, for example, even when an external load is applied to the rotor flange 5, displacement is small, and thus the resolver 27 is not erroneously operated. Therefore, even in a configuration to perform operation control with the single resolver 27 like the present configuration, it is possible to perform highly accurate rotation control. Furthermore, because the push ring 55 is molded with a resin material excellent in the compression characteristics, the displacement returns to the original state when the external load is removed.

As described above, in the present embodiment, the rotor flange 5 includes the flange portion 51 extending toward the one end surface 23a side in the axial direction of the outer ring 23 of the bearing 11, and the C-type retaining ring 53 arranged at the other end surface 23b side in the axial direction of the outer ring 23, and the push ring 55 formed of a resin material is arranged in the gap between the flange portion 51 and the one end surface 23a in the axial direction. Therefore, the width dimensional tolerance of the bearing 11 in the axial direction can be absorbed, and the movement of the bearing 11 in the axial direction can be completely prevented with the simple configuration.

Figure 4:
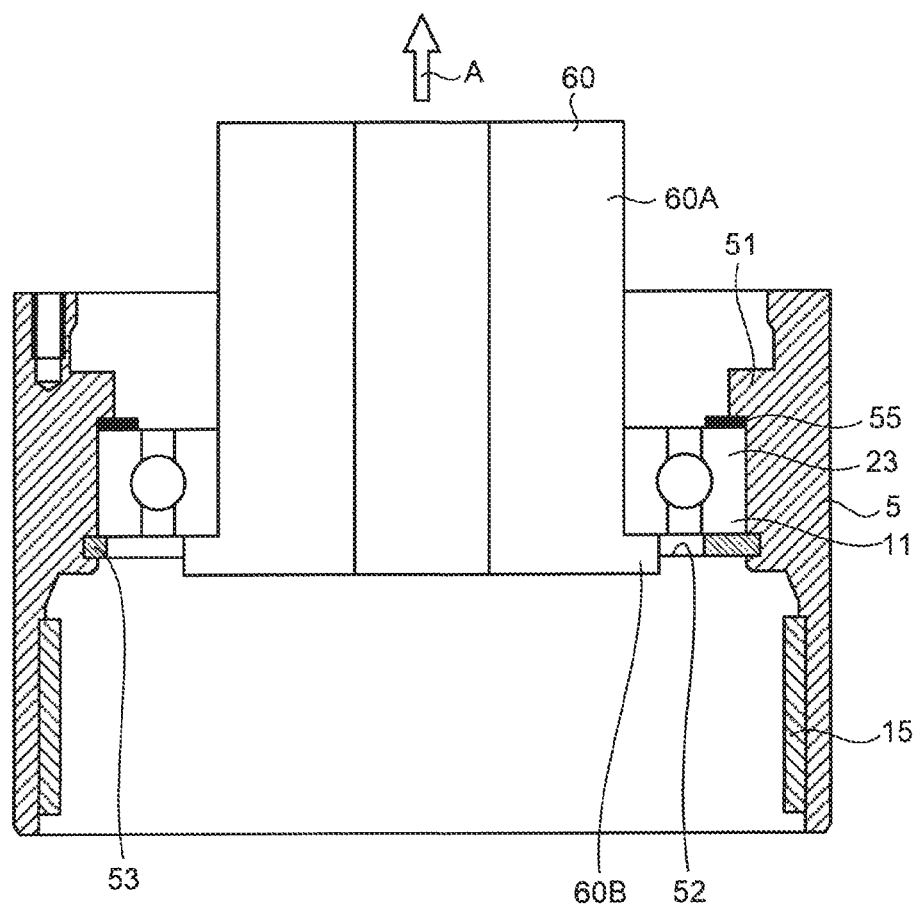
FIG. 4 is a diagram for explaining a procedure of attaching a push ring molded with a thermoplastic resin.

Next, a procedure of attaching the push ring 55 molded with a thermoplastic resin will be described. FIG. 4 is a cross-sectional view for explaining a procedure of attaching the push ring 55. To be specific, as illustrated in FIG. 4, the push ring 55 is arranged between the flange portion 51 and the bearing 11, and a jig 60 including a main body portion 60A to be fit into the inner ring 21 of the bearing 11, and a flange 60B to be in contact with the inner ring 21 in an outer peripheral portion of the main body portion 60A is attached. Then, a load in a compression direction (in the A direction in FIG. 4) is applied to the bearing 11 and the push ring 55 using the jig 60, and during this time, the C-type retaining ring 53 is mounted in the groove portion 52. Accordingly, the bearing 11 can be assembled in a state where no gap exists in the axial direction of the bearing 11. The load in the compression direction at the time of assembling is preferably the axial basic dynamic load rating of the bearing 11 or less, and is set to the axial basic static load rating or less at most, so that damage on the bearing 11 at the time of assembling can be prevented.

Figure 5:
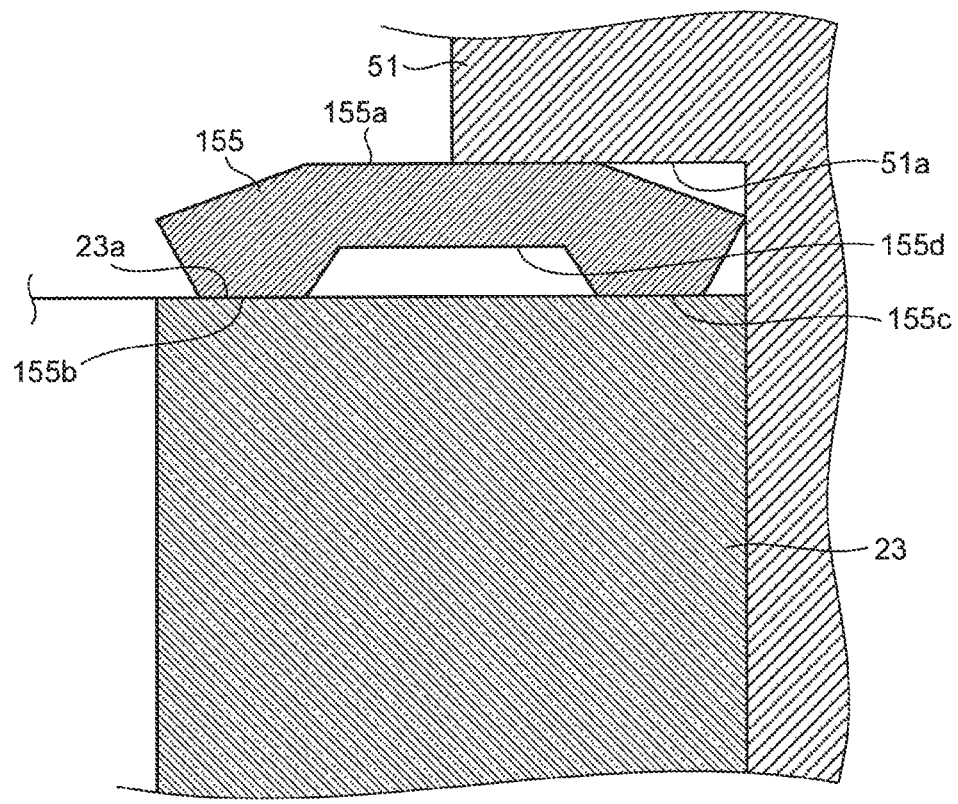
FIG. 5 is a partially enlarged cross-sectional view illustrating a cross-sectional shape of a push ring according to another embodiment.

In the present embodiment, the push ring 55 having the substantially hexagonal shape in cross section has been described as an example of the shape of the push ring 55. However, the shape of the push ring is not limited to the above example. For example, as illustrated in FIG. 5, a push ring 155 including a first contact surface 155a being in contact with the support surface 51a of the flange portion 51, and second contact surfaces 155b and 155c being in contact with the one end surface 23a in the axial direction of the outer ring 23 may be employed. In this push ring 155, the second contact surfaces 155b and 155c are formed separated from each other in the radial direction, a cavity portion 155d is provided between the second contact surfaces 155b and 155c, and the first contact surface 155a is positioned above the cavity portion 155d in the axial direction. That is, the push ring 155 has a configuration in which the first contact surface 155a and the two second contact surfaces 155b and 155c are shifted in the radial direction. Even with this shape, the push ring 155 can secure a large distortion amount (deflection amount) of the push ring 155 by being distorted using the cavity portion 155d, which allows the push ring 155 to be effectively deformed.

Furthermore, in the above-described embodiment, the push ring 55 formed of the thermoplastic resin has been described. However, for example, the push ring may be formed by filling a thermosetting resin between the flange portion 51 and the one end surface 23a in the axial direction of the bearing 11 (outer ring 23). As the thermosetting resin to be used, a two-liquid mixing type epoxy resin-based adhesive is the most preferable. This adhesive has the following advantages. Firstly, because the adhesive requires a long curing time, it is easy to secure time to fill the thermosetting resin while a compressive load is applied around the bearing 11. Secondly, while curing progresses at normal temperature, it is possible to accelerate the curing progress by raising the temperature a little such as to 60° C. Thirdly, the adhesive is less affected by variation of cure conditions due to a work environment compared to a two-liquid type that reacts with humidity in the air or the like. Furthermore, because grease is filled in the bearing 11, a type that causes a curing reaction within a use temperature range of the bearing 11 is preferable. The epoxy resin-based adhesive is also characterized in that it has the least variation in mechanical strength (for example, tensile shear strength) even if temperature rises. A total of dimension variation of the bearing 11 or the C-type retaining ring 53 is about 0.06 mm, typically 0.2 mm or less, which provides appropriate conditions to cure the epoxy resin. Furthermore, the epoxy resin-based adhesive is characterized in that compressive strength is higher than shear strength or peel strength, and thus the epoxy resin-based adhesive is preferable as a material to be filled in the gap.

Figure 6:
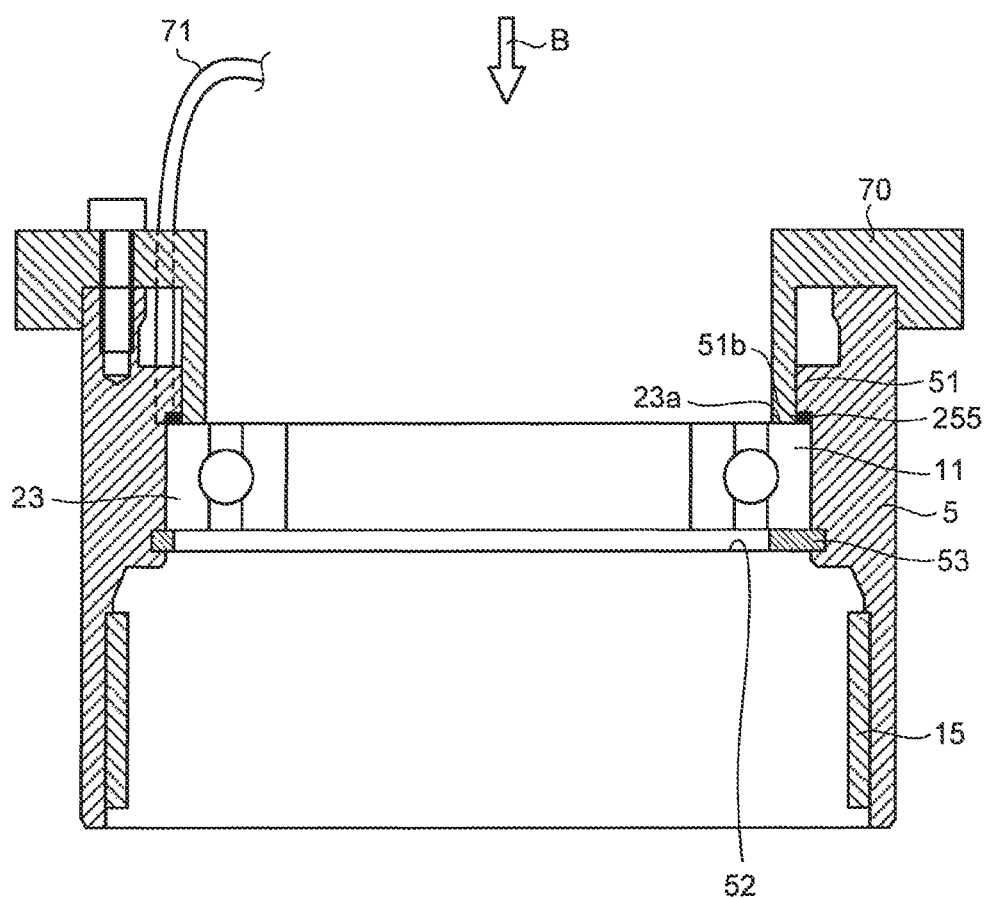
FIG. 6 is a diagram for explaining a procedure of filling a thermosetting resin between a flange portion and one end surface in an axial direction of a bearing.

FIG. 6 is a diagram for explaining a procedure of filling the thermosetting resin between the flange portion 51 and the one end surface 23a in the axial direction of the bearing 11 (outer ring 23). In the case of using the thermosetting resin, the compressive load is applied in a direction of filling the gap between the C-type retaining ring 53 and the bearing 11 in the axial direction (direction of B in FIG. 6), using a pushing jig 70 illustrated in FIG. 6 in a state where the bearing 11 is incorporated in the flange portion 51 and the C-type retaining ring 53 is also incorporated. Then, in a state where the compressive load is being applied, the thermosetting resin that has been mixed and in which the chemical reaction has started but curing has not started yet (not cured) is filled into the gap using a small tube 71 to mold a push ring 255. In consideration of the compressive strength, temperature contraction, and a creep property of the resin among mechanical characteristics of the thermosetting resin to be filled, the compressive load is preferably set to a value by which the mechanical characteristics of the push ring 255 do not pose a problem when using the motor. Furthermore, as illustrated in FIG. 6, the thermosetting resin may be filled in a state where the bearing 11 is pushed into the C-type retaining ring 53 side using the pushing jig 70. Furthermore, as another method, a tap is provided to the flange portion 51, and the pushing may be performed by a tap screw. Alternately, the thermosetting resin is applied on the flange portion 51 in advance, the C-type retaining ring 53 is installed such that the gap between the C-type retaining ring 53 and the bearing 11 can be adjusted, and then the thermosetting resin may be interposed therebetween.

Second Embodiment

By the way, the housing 7 (the housing inner 3 and the rotor flange 5) that supports the bearing 11 is manufactured by a machining operation such as a lathe. Therefore, unevenness called surface roughness is caused on a machining surface as a trace of cutting by a rotating edged tool (for example, JIS B0601 described as Ra1.6, Ra3.2, Ra6.3, or the like,). Furthermore, waviness (wave) is caused in a circumferential direction on an end surface in the axial direction of the machining surface. This waviness is caused by propagation of deformation due to a chuck at the time of lathe machining, and can be removed (finishing as a smooth surface) by increasing machining processes of a lathe or adding grinding processes. However, there remains a problem that machining operation processes increase and become complicated.

Meanwhile, the C-type retaining ring 53 is manufactured such that a material such as hard steel wire or stainless steel is pressed or rolled. Burr, flash, or sagging is caused on an end surface of the C-type retaining ring 53 at the time of manufacturing, and the C-type retaining ring 53 as a whole is warped like a potato chip. On the other hand, as the material for the bearing 11, metal having high mechanical strength and hardness such as SUJ2 is employed, and the grinding process is always performed on the end surfaces in the axial direction of the inner ring 21 and the outer ring 23 of the bearing 11, and thus the bearing 11 has smooth and beautiful surfaces.

The bearing device like the DD motor 10 is usually conveyed with various loads being mounted, and is used with another load being applied to the various loads. That is, various external loads are applied, and thus the DD motor 10 is required to be less likely to be displaced according to the external loads. Typically, it is preferable that the DD motor 10 has high rigidity. However, if the housing 7 has the trace of the edged tool or the waviness, and the C-type retaining ring 53 has the warp such as the burr or the flash, the components are deformed in a direction in which the waviness or the warp on the end surfaces of the components (the housing 7 or the C-type retaining ring 53) is crushed (flattened) when the external load is applied thereto, even if the bearing 11 is not moved in the axial direction. Therefore, there is a problem of a decrease in rigidity of the DD motor 10. Furthermore, due to the waviness or the warp, contact areas of the end surfaces in the axial direction of the components are reduced, and thus even fretting wear may be possibly caused in the end surfaces in the axial direction of these types of components due to drive vibration or the like.

In the DD motor 10 of the first embodiment, the rotor flange 5 includes the flange portion 51 extending toward the one end surface 23a side in the axial direction of the outer ring 23 of the bearing 11, and the C-type retaining ring 53 arranged at the other end surface 23b side in the axial direction of the outer ring 23, and the push ring 55 formed of a resin material is arranged in the gap between the flange portion 51 and the one end surface 23a in the axial direction of the outer ring 23. According to this configuration, the push ring 55 absorbs the width dimensional tolerance of the C-type retaining ring 53 and the bearing 11 in the axial direction, thereby preventing the movement of the bearing 11 in the axial direction with a simple configuration, and suppressing the influence of the waviness and the warp described above.

Meanwhile, in the configuration of the DD motor 10 of the first embodiment, the waviness or the warp may be deformed between the C-type retaining ring 53 and the other end surface 23b in the axial direction of the outer ring 23 (bearing 11), and between the C-type retaining ring 53 and the end surface in the axial direction of the groove portion 52. Therefore, a problem of a decrease in rigidity of the DD motor 10 has been expected. As a noticeable example, there may be a problem that the rigidity of the DD motor 10 (displacement caused by application of the load) differs, due to the deformation of the waviness or the warp, between a case where a load in a pure axial direction is applied in a direction in which the push ring 55 is crushed, and a case where a load in a pure axial direction is applied in a direction in which the C-type retaining ring 53 is crushed. A second embodiment is intended to prevent movement of a bearing 11 in an axial direction, and suppress a decrease in rigidity of a DD motor 10 due to warp caused in a C-type retaining ring 53 or waviness caused in a groove portion 52 to which the C-type retaining ring 53 is mounted.

Figure 7:
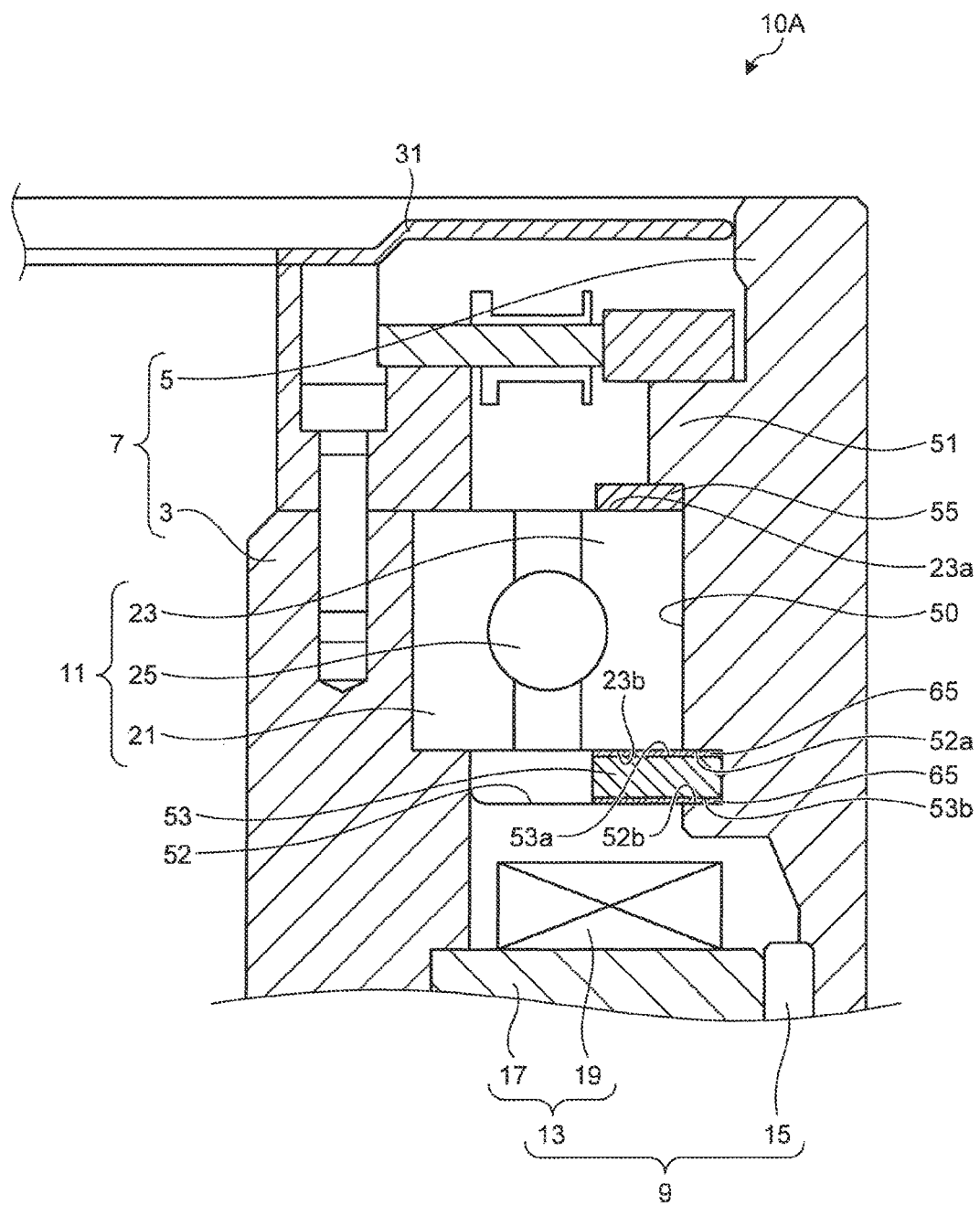
FIG. 7 is a partial cross-sectional view illustrating a support structure of a bearing of a direct drive motor according to a second embodiment.

FIG. 7 is a partial cross-sectional view illustrating a support structure of a bearing of a direct drive motor according to the second embodiment. In the second embodiment, different portions from the first embodiment will be described to avoid overlapping description, and portions having similar configurations to those of the first embodiment are denoted with the same reference signs, and description thereof is omitted.

As illustrated in FIG. 7, in a DD motor 10A, first gap sealing members 65 made of a polymeric resin material are respectively arranged in a gap between one end surface 53a in an axial direction of a C-type retaining ring 53 and the other end surface 23b in an axial direction of an outer ring 23 (bearing 11), a gap between the one end surface 53a in the axial direction of the C-type retaining ring 53 and one end surface 52a in an axial direction of a groove portion 52, and a gap between the other end surface 53b in the axial direction of the C-type retaining ring 53 and the other end surface 52b in the axial direction of the groove portion 52. The first gap sealing member 65 is formed of a polymeric resin material such as a thermoplastic resin and a thermosetting resin, and has a function to fill (seal) a gap caused by waviness or warp of the C-type retaining ring 53 or the groove portion 52.

The first gap sealing member 65 is preferably a resin material having excellent mechanical strength characteristics such as compressive yield strength, bend strength, and compressive elastic modulus (or a tensile elastic modulus or a Young's modulus), similarly to the push ring 55. This first gap sealing member 65 is arranged in the gap between the one end surface 53a in the axial direction of the C-type retaining ring 53 and the other end surface 23b in the axial direction of the outer ring 23 (bearing 11), the gap between the one end surface 53a in the axial direction of the C-type retaining ring 53 and the one end surface 52a in the axial direction of the groove portion 52, and the gap between the other end surface 53b in the axial direction of the C-type retaining ring 53 and the other end surface 52b in the axial direction of the groove portion 52. Accordingly, the first gap sealing member 65 fills (seals) the gap caused by the waviness or the warp of the C-type retaining ring 53 or the groove portion 52. Therefore, a decrease in rigidity of the DD motor 10 can be suppressed. Furthermore, occurrence of fretting wear can be prevented.

The gap caused by the waviness or the warp of the C-type retaining ring 53 or the groove portion 52 is very small in dimension (for example, 75 µm), and thus a paste-like or film-like resin can be selected. To be specific, it is preferable to use polyamide-imide (PAI) formed in a film manner as the thermoplastic resin, or an epoxy resin-based adhesive or an acrylic resin-based adhesive as the thermosetting resin.

As a procedure of installing the first gap sealing member 65, in a case of using the polyamide-imide (PAI) formed in a film manner, polyamide-imide films (resin films) are respectively stuck on the one end surface 53a and the other end surface 53b in the axial direction of the C-type retaining ring 53 in advance, and then the C-type retaining ring 53 is mounted in the groove portion 52. In this configuration, the first gap sealing member 65 can be easily arranged.

Furthermore, in a case of using the two-liquid mixing type epoxy resin-based adhesive, the main agent and the curing agent of the epoxy resin-based adhesive are mixed, and the mixed liquid is applied on the other end surface 23b in the axial direction of the outer ring 23 (bearing 11), the one end surface 53a and the other end surface 53b in the axial direction of the C-type retaining ring 53, and the one end surface 52a and the other end surface 52b in the axial direction of the groove portion 52 in advance, and then the C-type retaining ring 53 is mounted in the groove portion 52. In this configuration, the adhesive is cured after the C-type retaining ring 53 is mounted, whereby the gap caused by the waviness or the warp can be easily filled.

Furthermore, as the adhesive made of a thermosetting resin, an acrylic resin-based adhesive can be used. The acrylic resin-based adhesive has two liquids but the two liquids do not need to be mixed. The adherend is promptly cured only by applying a main agent and a curing agent (promotor) on one surface of each adherend, and crimping them. The acrylic resin-based adhesive has a short set time (fixing time), which is about five minutes, and tensile shear strength is 19.6 MPa (200 kgf/cm$^2$) and T-type peel strength is 3.9 kN/m (10 kgf/25 mm) or more. This exhibits performance as good as that of the epoxy resin-based adhesive. Furthermore, the acrylic resin-based adhesive is excellent in oil surface adhesiveness, shock resistance, and durability.

Therefore, in the case of using the acrylic resin-based adhesive, for example, the main agent is applied on the other end surface 23b in the axial direction of the outer ring 23 (bearing 11), and the one end surface 52a and the other end surface 52b in the axial direction of the groove portion 52, and the curing agent (promotor) is applied on the one end surface 53a and the other end surface 53b in the axial direction of the C-type retaining ring 53. Then, the C-type retaining ring 53 is mounted in the groove portion 52. Furthermore, a configuration in which the main agent is applied on the one end surface 53a and the other end surface 53b in the axial direction of the C-type retaining ring 53 may be employed. According to this configuration, the adhesive is cured by pressure applied to the end surfaces of the C-type retaining ring 53 after the C-type retaining ring 53 is mounted, and can easily fill the gap caused by the waviness or the warp. Furthermore, in this configuration, premixture of the adhesive is unnecessary. Therefore, the other end surface 23b in the axial direction of the outer ring 23 (bearing 11), and the one end surface 52a and the other end surface 52b in the axial direction of the groove portion 52 can be left in a state of the main agent or the curing agent being applied, which improves flexibility in the assembling process of the bearing 11.

Furthermore, the acrylic resin-based adhesive configured such that microcapsules encapsulating the curing agent are mixed in the main agent may be used. The adhesive of this type is applied on the other end surface 23b in the axial direction of the outer ring 23 (bearing 11) and the one end surface 52a and the other end surface 52b in the axial direction of the groove portion 52 in advance, and then the C-type retaining ring 53 is mounted in the groove portion 52. Furthermore, a configuration in which the adhesive is applied on the one end surface 53a and the other end surface 53b in the axial direction of the C-type retaining ring 53 may be employed. In this configuration, the microcapsules are broken by pressure caused when the C-type retaining ring 53 is mounted, and the encapsulated curing agent and the main agent are mixed and cured. Therefore, it is possible to cure the adhesive after the C-type retaining ring 53 is mounted by applying the adhesive on the one end surface 53a and the other end surface 53b in the axial direction of the C-type retaining ring 53 in advance, for example, and then it becomes easy to handle the adhesive.

Third Embodiment

As described above, the housing 7 (the housing inner 3 and the rotor flange 5) that supports the bearing 11 is manufactured by a machining operation such as using a lathe. To be specific, one side of the material (base material) is held with three to four claws of a mounting tool called a chuck, and the material is cut by a cutting tool (edged tool) being pressed against the opposite side of the material while rotating the material. In this way, the outer peripheral surfaces and the inner peripheral surfaces of the cylindrical housing inner 3 and the rotor flange 5 are machined.

Since the housing inner 3 and the rotor flange 5 support the inner ring 21 and the outer ring 23 of the bearing 11, enhancement of the roundness is important in machining the outer peripheral surface of the housing inner 3 and the inner peripheral surface of the rotor flange 5. Meanwhile, in the machining operation by a lathe, an end portion of the material is held with the chuck claws while the direction of the material is changed several times, and the material is cut by using various types of edged tools such as a tool for rough cutting and a tool for finishing cutting. In this case, if a small contaminant enters between the material and the claws, or if the held position of the material is imbalanced, coaxiality of the material becomes poor, affecting the shape of the cut portion. Furthermore, the material may be warped by being held with the chuck claws, and this warp has a lasting influence on not only the held portion, but also on the shape of the cut portion at an opposite side to the held side. Therefore, it requires a mature technique to determine the held portion.

To eliminate the warp of the material due to the chuck claws, usually, the cutting process is divided into several times and repeatedly performed to gradually enhance the roundness of the shape, and make dimension accuracy closer to a design value. Furthermore, in many cases, not only the cutting with the edged tool but also machining with a grinding stone is performed. As described above, in the machining of the housing 7 (the housing inner 3 and the rotor flange 5) in which the bearing 11 is incorporated, there is a problem of requiring many processes and labors in order to enhance the roundness, and eliminate (completely remove) the gap between the outer peripheral surface of the housing inner 3 and the inner peripheral surface of the bearing 11 (inner ring 21) and the gap between the inner peripheral surface of the rotor flange 5 and the outer peripheral surface of the bearing 11 (outer ring 23).

Meanwhile, in a case where the roundness of the outer peripheral surface of the housing inner 3 and the roundness of the inner peripheral surface of the rotor flange 5 are not sufficient, that is, in a case where the shape of the outer peripheral surface or that of the inner peripheral surface is a triangular shape (polygonal shape) or an elliptical shape, gaps (cavities) are caused between the outer peripheral surface of the housing inner 3 and the inner peripheral surface of the bearing 11 (inner ring 21), and between the inner peripheral surface of the rotor flange 5 and the outer peripheral surface of the bearing 11 (outer ring 23).

In this state, when a combined load (moment load) is applied to the DD motor 10, the bearing 11 and the housing 7 (the housing inner 3 and the rotor flange 5) are moved by an amount corresponding to the above-described gap due to a load component of the bearing 11 in the radial direction. As a result, highly accurate rotation in the DD motor 10 cannot be expected, and in addition, the movement leads to erroneous detection in the resolver 27. Furthermore, in a case where the outer peripheral surface of the housing inner 3 or the inner peripheral surface of the rotor flange 5 is warped, the warped portion and the bearing 11 are partially in a metal contact state. Therefore, fretting wear occurs and damages the bearing 11, and variation in rigidity of the DD motor 10 may be caused depending on a load direction.

In the DD motor 10 of the first embodiment, the rotor flange 5 includes the flange portion 51 extending toward the one end surface 23a side in the axial direction of the outer ring 23 of the bearing 11, and the C-type retaining ring 53 arranged at the other end surface 23b side in the axial direction of the outer ring 23, and the push ring 55 formed of a resin material is arranged in the gap between the flange portion 51 and the one end surface 23a in the axial direction of the outer ring 23. According to this configuration, the push ring 55 absorbs the width dimensional tolerance of the C-type retaining ring 53 and the bearing 11 in the axial direction, whereby the movement of the bearing 11 in the axial direction can be prevented with a simple configuration.

However, in the above configuration, in a case where the gap in the radial direction is caused between the bearing 11 and the housing 7 (the housing inner 3 and the rotor flange 5), a movement amount of the bearing 11 in the radial direction becomes large, and loads in a shearing direction and in a peeling direction are applied to the push ring 55. The push ring 55 is formed of a polymeric resin material. Therefore, if an extra load other than the compressive load in the axial direction is applied to the push ring 55, an allowable load of the DD motor 10 is limited, and further, resin materials that can be selected are also limited.

A third embodiment is intended to achieve simplification of machining of a housing 7, and suppress movement of a bearing 11 in a radial direction.

Figure 8:
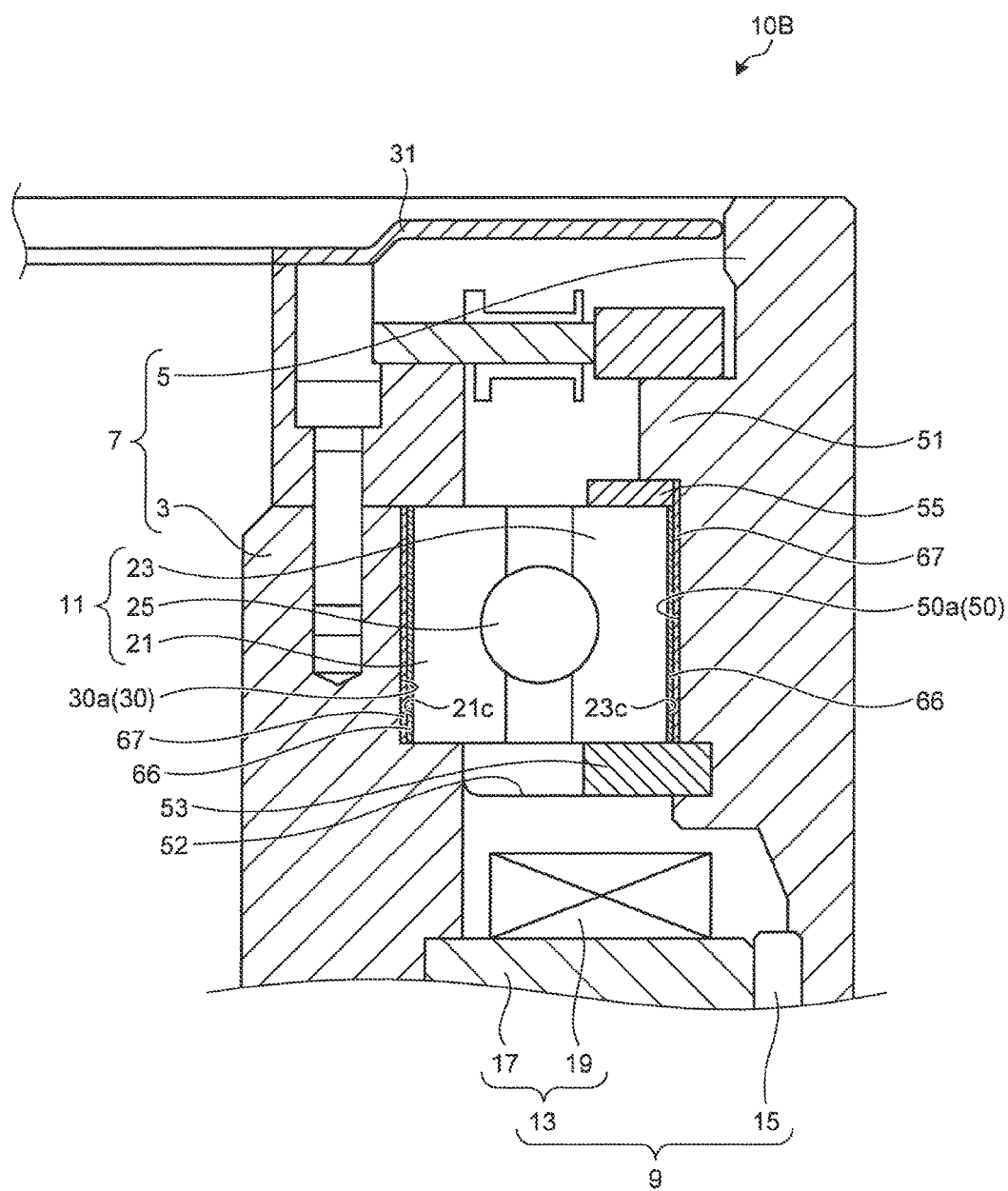
FIG. 8 is a partial cross-sectional view illustrating a support structure of a bearing of a direct drive motor according to a third embodiment.

FIG. 8 is a partial cross-sectional view illustrating a support structure of a bearing of a direct drive motor according to the third embodiment. In the third embodiment, different portions from the first embodiment will be described to avoid overlapping description, and portions having similar configurations to the first embodiment are denoted with the same reference signs and description thereof is omitted. Furthermore, the configuration of the C-type retaining ring 53 of the second embodiment may be combined with that of the third embodiment.

As illustrated in FIG. 8, a DD motor 10B includes a housing 7 constituted of a housing inner 3 and a rotor flange 5. In the third embodiment, an outer peripheral surface 30a of an inner ring holding portion 30 of the housing inner 3 and an inner peripheral surface 50a of the outer ring holding portion 50 of the rotor flange 5 are formed by reducing machining processes and labors. Accordingly, the roundness of the outer peripheral surface 30a of the inner ring holding portion 30 and the roundness of the inner peripheral surface 50a of the outer ring holding portion 50 are not sufficient. Furthermore, gaps are respectively provided between the outer peripheral surface 30a of the inner ring holding portion 30 and an inner peripheral surface 21c of an inner ring 21 of a bearing 11 and between the inner peripheral surface 50a of the outer ring holding portion 50 and an outer peripheral surface 23c of an outer ring 23 of the bearing 11. Each of diametral clearance gaps is roughly set to about 17 μm to 23 μm, and set to about 34 μm to 46 μm at a maximum (a radial clearance gap is half of the diametral clearance gap, and an absolute value of the gap is half of the radial clearance gap), as an effective value in a case of manufacturing a columnar component in two lathe turning processes. In a case of fitting the bearing 11 into the housing inner 3 and the rotor flange 5 by "interference fitting", distortion of the outer peripheral surface 30a of the inner ring holding portion 30 and the inner peripheral surface 50a of the outer ring holding portion 50 due to lathe machining is transmitted to a bearing raceway surface, which hinders accurate rotation of the bearing 11. As a result, it may become difficult to structure a highly accurate bearing device. Therefore, in the present embodiment, the gaps are respectively provided between the outer peripheral surface 30a of the inner ring holding portion 30 and the inner peripheral surface 21c of the inner ring 21 of the bearing 11, and between the inner peripheral surface 50a of the outer ring holding portion 50 and the outer peripheral surface 23c of the outer ring 23 of the bearing 11, which enables the accurate rotation of the bearing 11.

Therefore, as illustrated in FIG. 8, in the DD motor 10B, second gap sealing members 66 made of a polymeric resin material are respectively arranged in the gap between the inner peripheral surface 50a of the outer ring holding portion 50 (rotor flange 5) and the outer peripheral surface 23c of the outer ring 23 (bearing 11), and the gap between the outer peripheral surface 30a of the inner ring holding portion 30 (housing inner 3) and the inner peripheral surface 21c of the inner ring 21 (bearing 11). This second gap sealing member 66 is an adhesive made of a thermosetting resin, and has a function to fill (seal) the gaps caused at the time of machining.

When adhesives made of thermosetting resins are classified according to characteristics exhibited at high temperature, there are structural adhesives and non-structural adhesives. It is more preferable to use a structural adhesive. Furthermore, a modified structural adhesive or a combined thermosetting resin adhesive, in which desired characteristics have been obtained by adjusting temperature conditions, can also be used. These types of adhesives are excellent in: (1) application workability (fluidity); (2) surface (interfacial) tension (wettability); and (3) cohesive force of the polymeric material (intermolecular force and bonding strength) and mechanical physical properties after being cured.

To provide the adhesive in the gaps, the adhesive needs to be applied on the inner and outer peripheral surfaces of the bearing 11 and the housing 7 (the housing inner 3 and the rotor flange 5). Because the bearing 11 is incorporated into the housing 7 after the adhesive is applied, it requires a certain amount of time from the application of the adhesive to the incorporation. The adhesive made of a thermosetting resin has viscosity of 80 Pa·s before curing (a mixture of the main agent and the curing agent), or about half of 80 Pa·s. Therefore, a work to apply the adhesive to the inner and outer peripheral surfaces of the bearing 11 and the housing 7 (the housing inner 3 and the rotor flange 5) can be easily performed.

Next, the surface (interfacial) tension (wettability) is force to attract the polymer material to the inner and outer peripheral surfaces of the bearing 11 and the housing 7. Both the bearing 11 and the housing 7 (the housing inner 3 and the rotor flange 5) are made of metal. When the adhesive is applied on metal surfaces thereof, the surface (interfacial) tension works, and then distortion and waviness occur. Accordingly, tension is balanced in every place of the gaps between the bearing 11 and the housing 7 (the housing inner 3 and the rotor flange 5). As a result, an action to adjust (align) a rotation center of the bearing 11 and an axial center of the housing 7 (the housing inner 3 and the rotor flange 5) is caused. To be specific, even if the gap between the outer peripheral surface 23c of the outer ring 23 of the bearing 11 and the inner peripheral surface 50a of the outer ring holding portion 50 of the rotor flange 5 is about 45 μm before filling of the adhesive, rotary deflection of the rotor flange 5 (output shaft) in the radial direction is adjusted to 30 μm or less by the aligning action that occurs when the adhesive is filled into the gap.

In the third embodiment, the C-type retaining ring 53 and the push ring 55 are arranged respectively on the end surface in the axial direction of the bearing 11. Although the C-type retaining ring 53 and the push ring 55 restrain the movement of the bearing 11 in the axial direction, restraining force (contact force and contact frictional force) of the bearing 11 in the radial direction is low. Therefore, the C-type retaining ring 53 and the push ring 55 do not impede the aligning action by the adhesive.

Furthermore, it is possible but complicated to measure force (aligning force) itself acting on the aligning action described above. Therefore, a value of the adhesive interface strength that is measured when the bearing 11 is pulled out of the housing 7 (the housing inner 3 and the rotor flange 5) after the adhesive is cured provides an indication of the aligning force. As the measured value of the adhesive interface strength, about 12 N/mm$^2$ is an ideal value. However, even if the value is 3.7 N/mm$^2$ or more, the effect of the aligning action is exhibited.

Furthermore, the aligning force tends to be influenced by a surface state or a type of surface treatment of the inner peripheral surface 50a of the outer ring holding portion 50 and the outer peripheral surface 30a of the inner ring holding portion 30, to which the adhesive is applied. In the third embodiment, films 67 formed by electroless nickel-phosphorus plating are respectively provided on the inner peripheral surface 50a of the outer ring holding portion 50 and the outer peripheral surface 30a of the inner ring holding portion 30. In a case where the housing inner 3 and the rotor flange 5 are formed of iron (magnetic body), the configuration in which the films 67 are formed by the electroless nickel-phosphorus plating has more activated surfaces compared with a configuration where an iron surface is exposed on the inner peripheral surface 50a and the outer peripheral surface 30a, or a configuration where a film formed by low-temperature chrome plating is provided on the inner peripheral surface 50a and the outer peripheral surface 30a. Therefore, it has been found that the present configuration exhibits high aligning force. Furthermore, in an electroless nickel-phosphorus plating process, the adhesive property is high when the phosphorus concentration is high, and the aligning force can be increased. Furthermore, by performing the electroless nickel-phosphorus plating process, the corrosion resistance is enhanced, and the rotation accuracy of the DD motor 10B can be maintained high over time.

Furthermore, in the electroless nickel-phosphorus plating process, the film 67 becomes non-crystalline and non-magnetic when the phosphorus concentration is high. Therefore, in the configuration where the resolver 27 is provided in the housing 7 (the housing inner 3 and the rotor flange 5), an influence of magnetic force on the resolver 27 can be suppressed, and the rotation accuracy of the DD motor 10B can be enhanced from the electric perspective.

Finally, the cohesive force and mechanical physical properties that are exhibited after curing of the polymeric material are characteristics that influence the mechanical rigidity when the DD motor 10B is actually used, and are characteristics that influence reliability of a structure including the C-type retaining ring 53 and the push ring 55. The adhesive made of a thermosetting resin (to be specific, the epoxy resin-based adhesive) has less occurrence of internal distortion after curing, and the mechanical strength of the resin material itself is high. Therefore, the adhesive can sufficiently satisfy the mechanical rigidity of the DD motor 10B. Furthermore, interfacial failure strength and cohesive failure strength can be arbitrarily adjusted according to a mixture of the resin materials of the adhesive. It is preferable to determine the resin mixture of the adhesive to satisfy the aligning force and the mechanical rigidity in a well-balanced manner. Specific examples include a room temperature curing-type epoxy resin adhesive and a one-liquid epoxy adhesive. Because the adhesive is applied to the bearing 11, it needs to be used at temperature equal to or less than the heat resistance temperature of the grease of the bearing 11, and the room temperature curing-type epoxy resin adhesive is more preferable. Characteristics of the adhesive are often indicated by tension shear, compression shear, tensile strength, and peel strength, but the compression strength of the resin is important in the present configuration. Usually, a manufacturer of an adhesive hardly releases a value of the compressive strength. Typically, the compressive strength is about four times higher than the shear strength that indicates characteristics of cohesive failure. Therefore, the shear strength can be used as an index for selecting an adhesive.

As described above, the epoxy resin-based adhesive is filled in the gap between the inner peripheral surface 50a of the outer ring holding portion 50 and the outer peripheral surface 23c of the outer ring 23, and the gap between the outer peripheral surface 30a of the inner ring holding portion 30 and the inner peripheral surface 21c of the inner ring 21, so that the gaps are sealed. Accordingly, even if a moment load is applied to the DD motor 10B, the movement of the bearing 11 and the housing 7 (the housing inner 3 and the rotor flange 5) in the radial direction can be prevented. Therefore, the DD motor 10B that sufficiently satisfies the mechanical rigidity of the bearing 11 as well as the highly accurate rotation of the DD motor 10B can be realized, and erroneous detection in the resolver 27 can be prevented.

Furthermore, even if roundness error, surface roughness, and dimension error occur in the inner peripheral surface 50a and the outer peripheral surface 30a of the housing 7 (the housing inner 3 and the rotor flange 5) that supports the bearing 11, the rotation center of the bearing 11 and the axial center of the housing 7 (the housing inner 3 and the rotor flange 5) can be aligned by the aligning action that occurs when the adhesive is filled in the gaps.

In the third embodiment, the adhesives are respectively filled in the gap between the inner peripheral surface 50a of the outer ring holding portion 50 (rotor flange 5) and the outer peripheral surface 23c of the outer ring 23 (bearing 11), and the gap between the outer peripheral surface 30a of the inner ring holding portion 30 (housing inner 3) and the inner peripheral surface 21c of the inner ring 21 (bearing 11), whereby the movement of the bearing 11 and the housing 7 (the housing inner 3 and the rotor flange 5) in the radial direction is prevented, and the aligning action of the bearing 11 and the housing 7 works. Therefore, the process can be simplified in the machining process of manufacturing the outer peripheral surface 30a of the inner ring holding portion 30 (housing inner 3) and the inner peripheral surface 50a of the outer ring holding portion 50 (rotor flange 5), and the highly accurate DD motor 10B can be realized in an easier and simpler manner with less cost.

Furthermore, even in a case where the above machining process is simplified, by filling the adhesives in the gap between the inner peripheral surface 50a of the outer ring holding portion 50 (rotor flange 5) and the outer peripheral surface 23c of the outer ring 23 (bearing 11), and the gap between the outer peripheral surface 30a of the inner ring holding portion 30 (housing inner 3) and the inner peripheral surface 21c of the inner ring 21 (bearing 11), the following functions and effects are exhibited. (A) Non-uniform metal contact between the inner ring 21 and the outer ring 23 of the bearing 11, and between the housing inner 3 and the rotor flange 5 can be avoided. (B) Non-uniform and excessive insertion such that the rolling element bearing ring of the bearing 11 is distorted can be prevented. (C) The bearing 11 can be supported not to be shifted in the radial direction even if a radial load is applied to the DD motor 10B from the outside. (D) Tensile load or load in a peeling direction, other than the compressive load that is applied non-uniformly on the entire periphery, is not applied to the C-type retaining ring 53 and the push ring 55, when a moment load is applied to the DD motor 10B.

Fourth Embodiment

Figure 9:
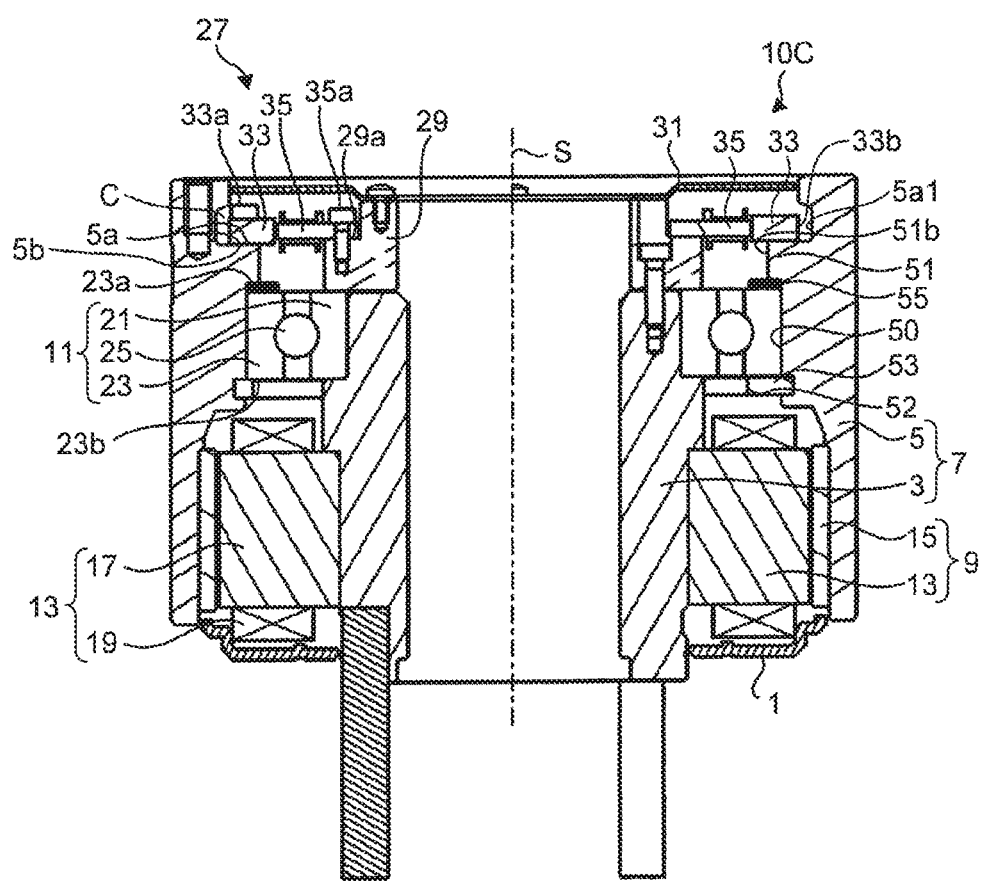
FIG. 9 is a cross-sectional view illustrating a configuration of a direct drive motor according to a fourth embodiment.

FIG. 9 is a cross-sectional view illustrating a configuration of a direct drive motor according to a fourth embodiment. In the fourth embodiment, different portions from the first embodiment will be described to avoid overlapping description, and portions having similar configurations to the first embodiment are denoted with the same reference signs and description thereof is omitted. Furthermore, the configurations of the second and third embodiments described above may be combined with the fourth embodiment.

In a DD motor 10C according to the fourth embodiment, a single resolver 27 as an incremental resolver that detects relative displacement of a rotor 15 with respect to a stator 13 is arranged in a housing 7 to suppress an increase in dimension in an axial direction, similarly to the DD motor 10 according to the first embodiment. The resolver 27 includes an annular resolver rotor 33 and a resolver stator 35 arranged to face the resolver rotor 33 with a predetermined interval. As described above, the resolver rotor 33 is integrally attached to a resolver rotor fixing portion 5a formed on an inner peripheral surface of a rotor flange 5 with a bolt 33a. Furthermore, the resolver stator 35 is integrally attached to a resolver stator fixing portion 29a formed on an outer peripheral surface of an inner ring holder 29 with a bolt 35a.

Typically, a resolver detects a rotation position according to change of self-reactance, and is susceptible to surrounding structures. Therefore, for example, in a configuration in which the housing is arranged in proximity to an outer diameter side of the resolver, a detection signal of the resolver is not stabilized, and detection of a highly accurate rotational state may become difficult.

Therefore, in the fourth embodiment, as illustrated in FIG. 9, a relief groove 5b for providing a space C is formed in the resolver rotor fixing portion 5a of the rotor flange 5 at a facing surface side facing the resolver rotor 33 fixed to the resolver rotor fixing portion 5a (at an outer diameter surface side of the resolver rotor 33 in FIG. 1). The relief groove 5b widens a distance between an inner peripheral surface 5a1 of the resolver rotor fixing portion 5a and an outside surface 33b in the radial direction of the resolver rotor 33 facing the inner peripheral surface 5a1. The relief groove 5b is provided throughout the entire periphery of the inner peripheral surface 5a1 of the resolver rotor fixing portion 5a so as to have a diameter increasing outward in the radial direction. As described above, the resolver rotor 33 is fixed to the rotor flange 5 to have the space C between the surface 33b at an opposite side to the facing surface facing the resolver stator 35, and the inner peripheral surface 5a1 of the resolver rotor fixing portion 5a.

In this configuration, the relief groove 5b is provided throughout the entire periphery of the inner peripheral surface 5a1 of the resolver rotor fixing portion 5a, so that the space C can be provided between the inner peripheral surface 5a1 and the outside surface 33b in the radial direction of the resolver rotor 33. Therefore, the space C allows the resolver 27 to be less susceptible to an external magnetic flux, and can accurately detect the reluctance change. Therefore, the rotational state of the DD motor 10C can be accurately detected.

Figure 10:
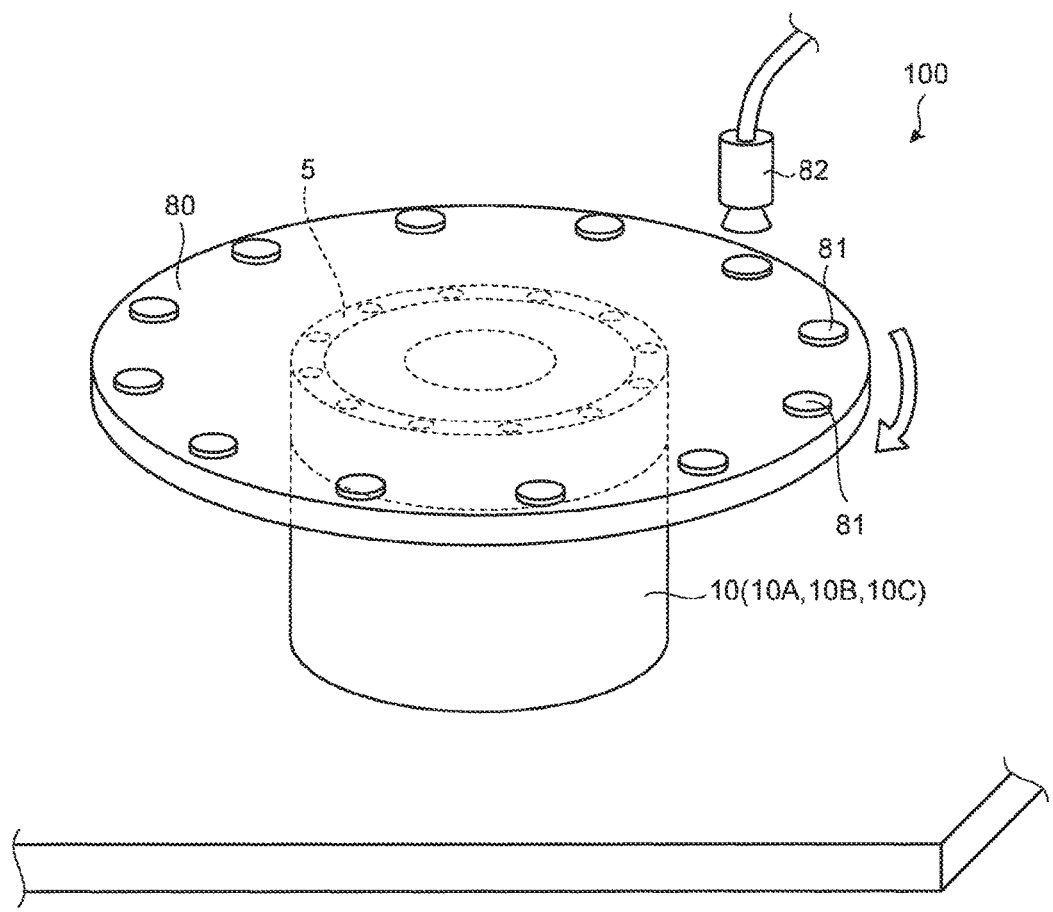
FIG. 10 is a schematic configuration diagram of an inspection device using the direct drive motor according to the above-described embodiments.

FIG. 10 is a schematic configuration diagram of an inspection device 100 using the DD motor 10 (10A, 10B, or 10C) of the above-described embodiments. A disk-like table 80 is coupled to an upper end of the rotor flange 5 of the DD motor 10, and the table 80 is rotated by an operation of the rotor flange 5. Inspection target objects (objects to be conveyed or target objects) 81 are arranged on an edge portion of the table 80 at equal intervals. In this configuration, the inspection object 81 is conveyed by being rotated together with the table 80 by an operation of the DD motor 10, and a conveying device is configured to have the DD motor 10 and the table 80. Furthermore, a camera (inspection unit) 82 that individually observes the inspection target objects 81 rotated (conveyed) together with the table 80 is arranged above the edge portion of the table 80. Then, by capturing images with the camera 82, the inspection target objects 81 can be inspected based on the captured images. According to this configuration, positional accuracy in moving the inspection target objects 81 below the camera 82 can be enhanced, and a decrease in size of the inspection device 100 can be realized.

Figure 11:
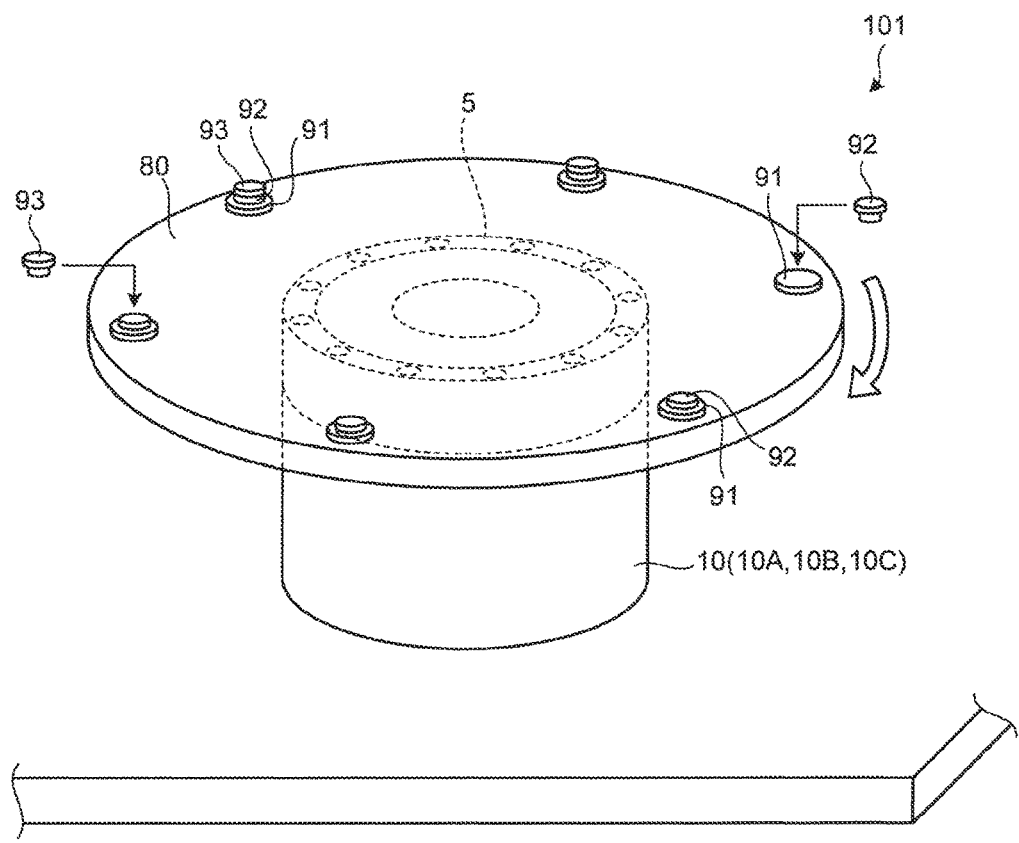
FIG. 11 is a schematic configuration diagram of a machine tool using the direct drive motor according to the above-described embodiments.

FIG. 11 is a schematic configuration diagram of a machine tool 101 using the DD motor 10 (10A, 10B, or 10C) of the above-described embodiments. A disk-like table 80 is coupled to an upper end of the rotor flange 5 of the DD motor 10, and the table 80 is rotated by an operation of the rotor flange 5. Machining target objects (target objects) 91 are arranged on an edge portion of the table 80 at equal intervals. Furthermore, a loading robot (machining unit) that performs an operation to load new parts 92 and 93 on the machining target objects 91 is arranged at the edge portion of the table 80, and can perform machining on the machining target objects 91 in accordance with the rotation of the table 80. According to this configuration, positional accuracy in moving the machining target objects 91 to the position of the loading robot can be enhanced, and a decrease in size of the machine tool 101 can be realized.

As described above, according to the above-described embodiments, the DD motor 10 includes: the bearing 11 including the inner ring 21 and the outer ring 23 arranged to face each other with the rolling element 25 interposed therebetween; and the housing 7 including the housing inner 3 supported by the inner ring 21 and the rotor flange 5 supported by the outer ring 23. The rotor flange 5 includes the flange portion 51 extending to the one end surface 23a side in the axial direction of the outer ring 23, and the C-type retaining ring 53 arranged at the other end surface 23b side in the axial direction of the outer ring 23. The push ring 55 formed of a resin material is provided in the gap between the flange portion 51 and the one end surface 23a in the axial direction. Therefore, with the simple configuration, the width dimensional tolerance of the bearing 11 in the axial direction can be absorbed, and the movement of the bearing 11 in the axial direction can be completely prevented.

Furthermore, according to the above-described embodiments, the rotor flange 5 where the flange portion 51 is formed includes the groove portion 52 extending in the circumferential direction, and the C-type-retaining ring 53 is mounted in the groove portion 52. Therefore, the C-type retaining ring 53 can be easily attached, and simplification of the support structure of the bearing 11 can be realized.

Furthermore, according to the above-described embodiments, the housing inner 3 and the rotor flange 5 are each formed into the cylindrical shape, and the rotor flange 5 where the flange portion 51 is formed is seamlessly molded in an extending direction of the cylinder. Therefore, the bearing 11 can be supported while an increase in size of the rotor flange 5 in the axial direction can be suppressed, and a decrease in size of the DD motor 10 can be achieved.

Furthermore, according to the above-described embodiments, the push ring 55 includes the first contact surface 55a being in contact with the support surface 51a of the flange portion 51, and the second contact surface 55b being in contact with the one end surface 23a in the axial direction of the outer ring 23, and the first contact surface 55a and the second contact surface 55b are formed at positions shifted in the radial direction of the push ring 55. Therefore, when a load is applied to the push ring 55, the push ring 55 is distorted using the gap between the push ring 55 and the support surface 51a of the flange portion 51 or between the push ring 55 and the one end surface 23a in the axial direction of the outer ring 23. Therefore, a large distortion amount (deflection amount) of the push ring 55 can be secured, which allows the push ring 55 to be effectively deformed.

Furthermore, according to the above-described embodiments, the DD motor 10 includes: the motor unit 9 including the stator 13 fixed to the housing inner 3, and the rotor 15 fixed to the rotor flange 5 and rotatable with respect to the stator 13; and the resolver 27 for detecting the rotational state of the motor unit 9. The resolver 27 is a single resolver of an incremental type, which detects the relative displacement of the rotor 15 with respect to the stator 13. Therefore, an increase in height of the housing 7 in the axial direction can be suppressed, and a decrease in size of the DD motor 10 can be achieved.

Furthermore, according to the above-described embodiments, the DD motor 10 includes: the power factor detection unit 41 that detects a position where the power factor becomes 0 when power is supplied to the motor unit 9; and the translocation control unit 43 that controls translocation of the motor unit 9 according to the position where the power factor becomes 0 and the resolver signal output from the resolver 27. Therefore, the absolute resolver is unnecessary in detecting translocation timing of the motor current. Therefore, it is not necessary to mount the two types of rotation detectors including the absolute resolver and the incremental resolver, unlike the conventional configuration, and the single resolver configuration can be employed. Therefore, the rotational state of the motor unit 9 can be accurately detected, and the height of the DD motor 10 in the axial direction can be suppressed.

Furthermore, according to the above-described embodiments, the relief groove 5b for providing the space C is formed in the resolver rotor fixing portion 5a of the rotor flange 5 at the facing surface side facing the resolver rotor 33 fixed to the resolver rotor fixing portion 5a (the outer diameter surface side of the resolver rotor 33 in FIG. 1). Therefore, the resolver 27 becomes less susceptible to the external magnetic flux, and the reluctance change can be accurately detected.

Furthermore, according to the above-described embodiments, the motor unit 9, the bearing 11, and the resolver 27 are arranged side by side in the axial direction of the bearing 11. Therefore, it is possible to suppress an increase in size in the radial direction about the rotation axis S, which allows the installation area (so-called footprint) of the DD motor 10 to be reduced.

Furthermore, according to the above-described embodiments, the push ring 55 is provided in the gap between the flange portion 51 and the one end surface 23a in the axial direction of the bearing 11, and the first gap sealing members 65 are arranged in the gap between the C-type retaining ring 53 and the other end surface 23b in the axial direction of the bearing 11 and the gap between the C-type retaining ring 53 and the groove portion 52. Therefore, the first gap sealing members 65 seal the gap caused by the waviness or the warp of the C-type retaining ring 53 or the groove portion 52, whereby a decrease in rigidity of the DD motor 10A can be suppressed.

Furthermore, according to the above-described embodiments, the first gap sealing member 65 is a resin film sticking on the C-type retaining ring 53. Therefore, the first gap sealing members 65 can be easily arranged in the gap between the C-type retaining ring 53 and the other end surface 23b in the axial direction of the bearing 11 and the gap between the C-type retaining ring 53 and the groove portion 52.

Furthermore, according to the above-described embodiments, the first gap sealing member 65 is an adhesive including the main agent, and the curing agent that is mixed with the main agent and cures the main agent. Therefore, the adhesive is cured after the C-type retaining ring 53 is mounted in the groove portion 52, so that the gap caused by the waviness or the warp of the C-type retaining ring 53 or the groove portion 52 can be easily sealed.

Furthermore, according to the above-described embodiments, the C-type retaining ring 53 is mounted in the groove portion 52 in a state where one of the main agent and the curing agent is applied on the other end surface 23b in the axial direction and the groove portion 52 of the bearing 11, and the other of the main agent and the curing agent is applied on the C-type retaining ring 53. Therefore, premixture of the adhesive becomes unnecessary, and the other end surface 23b in the axial direction and the groove portion 52 of the bearing 11 can be left in the state of the main agent or the curing agent being applied, which improves flexibility in the assembling process of the bearing 11.

Furthermore, according to the above-described embodiments, the adhesive is configured such that the curing agent encapsulated in microcapsules is mixed in the main agent, and when the microcapsules are broken by external force, the curing agent and the main agent are mixed and cured. Therefore, for example, the adhesive is applied on the C-type retaining ring 53 in advance, so that the adhesive can be cured after the C-type retaining ring 53 is mounted in the groove portion 52, and then it becomes easy to handle the adhesive.

Furthermore, according to the above-described embodiments, the second gap sealing member 66 is arranged in at least one of the gap between the inner peripheral surface 21c of the inner ring 21 and the outer peripheral surface 30a of the inner ring holding portion 30 (housing inner 3) and the gap between the outer peripheral surface 23c of the outer ring 23 and the inner peripheral surface 50a of the outer ring holding portion 50 (rotor flange 5). Therefore, the second gap sealing member 66 seals the gap, whereby simplification of machining of the housing 7 (the housing inner 3 and the rotor flange 5) can be achieved, and the movement of the bearing 11 in the radial direction can be suppressed.

Furthermore, according to the above-described embodiments, the second gap sealing member 66 is an adhesive that is cured after being filled in the gap between the inner peripheral surface 21c of the inner ring 21 and the outer peripheral surface 30a of the inner ring holding portion 30 (housing inner 3) and the gap between the outer peripheral surface 23c of the outer ring 23 and the inner peripheral surface 50a of the outer ring holding portion 50 (rotor flange 5). Therefore, alignment of the center of the bearing 11 and the center of the housing 7 (the housing inner 3 and the rotor flange 5) can be realized by balancing of tension by the adhesive filled in the gaps.

Furthermore, according to the above-described embodiments, the housing inner 3 and the rotor flange 5 are formed of a magnetic body, and the electroless nickel-phosphorus plating process is performed on the outer peripheral surface 30a of the inner ring holding portion 30 (housing inner 3) and the inner peripheral surface 50a of the outer ring holding portion 50 (rotor flange 5) in which the second gap sealing member 66 is arranged. Therefore, the aligning force can be increased, compared with one on which no electroless nickel-phosphorus plating process is performed.

The embodiments have been described, but the embodiments are not limited by the described content. In the above-described embodiments, the DD motor 10 has been described as an example of the bearing device. However, the embodiments are not limited to motors as long as the support structure of the bearing described above is included. Furthermore, the DD motor 10 of the present embodiments is an outer rotor-type motor, but obviously, an inner rotor-type motor is also employable. Furthermore, in the above-described embodiments, the support structure of the bearing 11 is provided at the rotor flange 5 side. However, the embodiments are not limited thereto, and the support structure may be provided at the housing inner 3 side or at both sides. Furthermore, the push ring 55 is most preferably installed between the flange portion 51 and the one end surface 23a in the axial direction of the bearing 11 (outer ring 23). However, the push ring 55 may be installed between the C-type retaining ring 53 and the other end surface 23b in the axial direction of the bearing 11 (outer ring 23). Furthermore, the push rings 55 may be respectively installed at both the end surface sides (the flange portion 51 side and the C-type retaining ring 53 side) in the axial direction of the bearing 11 (outer ring 23) depending on the characteristics of the polymeric material. Furthermore, in the present embodiments, the configuration including the single bearing 11 has been described. However, similar effects can be obtained by a configuration in which a plurality of bearings is combined and used (including a case where a spacer is provided between the bearings). Furthermore, in the above-described embodiments, the configuration in which the inner ring 21 of the bearing 11 is sandwiched by the housing inner 3 and the inner ring holder 29 is employed. However, because the outer ring 23 is firmly supported in the axial direction, the housing inner 3 may be extended to the upper end as is the rotor flange 5 so that the inner ring 21 can be fixed to the outer peripheral surface of the housing inner 3 with an adhesive or by means of shrinkage fitting.

REFERENCE SIGNS LIST

3 HOUSING INNER (FIRST HOUSING)
5 ROTOR FLANGE (SECOND HOUSING)
5a RESOLVER ROTOR FIXING PORTION
5b RELIEF GROOVE
7 HOUSING
9 MOTOR UNIT
10, 10A, 10B, and 10C DD MOTOR (BEARING DEVICE)
11 BEARING
13 STATOR (STATIONARY ELEMENT)
15 ROTOR (ROTATING ELEMENT)
20 CONTROL UNIT
21 INNER RING
21c INNER PERIPHERAL SURFACE OF INNER RING
23 OUTER RING
23a ONE END SURFACE IN AXIAL DIRECTION (ONE AXIAL-DIRECTION END SURFACE)
23b THE OTHER END SURFACE IN AXIAL DIRECTION (THE OTHER AXIAL-DIRECTION END SURFACE)
23c OUTER PERIPHERAL SURFACE OF OUTER RING
25 ROLLING ELEMENT
27 RESOLVER (ROTATION DETECTOR)
33 RESOLVER ROTOR
41 POWER FACTOR DETECTION UNIT
43 TRANSLOCATION CONTROL UNIT
51 FLANGE PORTION
52 GROOVE PORTION
53 C-TYPE RETAINING RING (RETAINING RING)
55, 155, and 255 PUSH RING
55a and 155a FIRST CONTACT SURFACE
55b, 155b, and 155c SECOND CONTACT SURFACE
55c FIRST INCLINED SURFACE
55d SECOND INCLINED SURFACE
65 FIRST GAP SEALING MEMBER
66 SECOND GAP SEALING MEMBER
67 FILM
80 TABLE
81 INSPECTION TARGET OBJECT (OBJECT TO BE CONVEYED, TARGET OBJECT)
82 CAMERA (INSPECTION UNIT)
91 MACHINING TARGET OBJECT (TARGET OBJECT)
100 INSPECTION DEVICE
101 MACHINE TOOL
C SPACE
S ROTATION AXIS

The invention claimed is:

1. A direct drive motor comprising:
a bearing including an inner ring and an outer ring arranged to face each other in a relatively rotatable manner, and a plurality of rolling elements interposed between the inner ring and the outer ring in a rollable manner;
a motor unit including a stator and a rotor rotatable with respect to the stator; and
a housing including: a first housing supported by the inner ring and to which the stator is fixed; and a second housing supported by the outer ring and to which the rotor is fixed, wherein
the inner ring is sandwiched by the first housing and an inner ring holder connected to the first housing,
the second housing includes: a flange portion protruding in a radial direction from an inner peripheral surface of the second housing and extending toward one end surface side in an axial direction of the outer ring; and a retaining ring arranged at the other end surface side in the axial direction of the outer ring, the flange portion and the retaining ring sandwiching the outer ring therebetween,
a push ring formed of a polymeric resin material that is a thermoplastic resin or a thermosetting resin is provided in a gap between the flange portion and the one end surface in the axial direction of the outer ring, or a gap between the retaining ring and the other end surface in the axial direction of the outer ring, absorbs width dimensional tolerance of the bearing and the retaining ring in the axial direction, and prevents the bearing from moving in the axial direction relative to the second housing,
the second housing in which the flange portion is formed includes a groove portion extending in a circumferential direction, and the retaining ring is mounted in the groove portion,
the push ring is provided in the gap between the flange portion and the one end surface in the axial direction of the outer ring, and
a first gap sealing member formed of a resin material is arranged in at least one of the gap between the retaining ring and the other end surface in the axial direction of the outer ring, and a gap between the retaining ring and the groove portion.

2. The direct drive motor according to claim 1, wherein the first housing and the second housing are each formed into a cylindrical shape, and the second housing in which the flange portion is formed is seamlessly molded in an extending direction of the cylinder.

3. The direct drive motor according to claim 1, wherein the push ring includes a first contact surface being in contact with the flange portion or the retaining ring, and a second contact surface being in contact with the one end surface or the other end surface in the axial direction of the outer ring,
the first contact surface and the second contact surface are formed at positions shifted in a radial direction of the push ring,
the push ring includes a portion that is provided below the first contact surface in the axial direction, is continuous to the second contact surface, and is inclined in a direction away from the one end surface or the other end surface in the axial direction of the outer ring.

4. The direct drive motor according to claim 1, wherein the first gap sealing member is a resin film sticking on the retaining ring.

5. The direct drive motor according to claim 1, wherein the first gap sealing member is an adhesive including a main agent, and a curing agent that is mixed with the main agent and cures the main agent.

6. The direct drive motor according to claim 5, wherein the retaining ring is mounted in the groove portion in a state where one of the main agent and the curing agent is applied on the other end surface in the axial direction of the outer ring and the groove portion, and the other of the main agent and the curing agent is applied on the retaining ring.

7. The direct drive motor according to claim 5, wherein the adhesive is configured such that the curing agent encapsulated in a microcapsule is mixed in the main agent, and the curing agent and the main agent are mixed and cured by the microcapsule being broken by external force.

8. The direct drive motor according to claim 1, wherein a second gap sealing member is arranged in at least one of a gap between the inner ring and the first housing and a gap between the outer ring and the second housing.

9. The direct drive motor according to claim 8, wherein the second gap sealing member is an adhesive that is cured after being filled in the gap.

10. The direct drive motor according to claim 8, wherein the first housing and the second housing are formed of a magnetic body, and an electroless nickel-phosphorus plating process is performed on surfaces of the first housing and the second housing in which the second gap sealing member is arranged.

11. The direct drive motor according to claim 1, comprising:
   a rotation detector configured to detect a rotational state of the motor unit, wherein
   the rotation detector is a single resolver of an incremental type that detects relative displacement of the rotor with respect to the stator.

12. The direct drive motor according to claim 11, wherein
   the resolver includes a resolver stator fixed to the first housing, and a resolver rotor facing the resolver stator with a predetermined interval and fixed to the second housing, and
   the resolver rotor is fixed to the second housing to have a space on a surface at an opposite side to a facing surface facing the resolver stator.

13. The direct drive motor according to claim 11, comprising:
   a power factor detection unit configured to detect a position where a power factor becomes 0 when power is supplied to the motor unit; and
   a translocation control unit configured to control translocation of the motor unit according to the position where the power factor becomes 0, and incremental information output from the resolver.

14. The direct drive motor according to claim 11, wherein the motor unit, the bearing, and the resolver are arranged side by side in an axial direction of the bearing.

15. A conveying device comprising:
   the direct drive motor according to claim 1,
   wherein the conveying device is configured to convey an object to be conveyed by rotation of the first housing or the second housing.

16. An inspection device comprising:
   the direct drive motor according to claim 1; and
   an inspection unit configured to individually inspect an object moved by rotation of the first housing or the second housing.

17. A machine tool comprising:
   the direct drive motor according to claim 1; and
   a machining unit configured to individually machine an object moved by rotation of the first housing or the second housing.

* * * * *